(12) United States Patent
DeNeale et al.

(10) Patent No.: US 9,996,369 B2
(45) Date of Patent: Jun. 12, 2018

(54) ADAPTIVE DATA ANALYTICS SERVICE

(71) Applicant: Anki, Inc., San Francisco, CA (US)

(72) Inventors: Patrick DeNeale, Oakland, CA (US); Tom Eliaz, Menlo Park, CA (US)

(73) Assignee: Anki, Inc., San Francisco, CA (US)

( * ) Notice: Subject to any disclaimer, the term of this patent is extended or adjusted under 35 U.S.C. 154(b) by 0 days. days.

(21) Appl. No.: 14/968,589

(22) Filed: Dec. 14, 2015

(65) Prior Publication Data

US 2016/0196152 A1    Jul. 7, 2016

Related U.S. Application Data

(60) Provisional application No. 62/099,749, filed on Jan. 5, 2015.

(51) Int. Cl.
*G06F 1/24*    (2006.01)
*G06F 9/00*    (2006.01)
(Continued)

(52) U.S. Cl.
CPC ...... *G06F 9/44505* (2013.01); *G06F 11/3024* (2013.01); *G06F 11/3428* (2013.01);
(Continued)

(58) Field of Classification Search
CPC .................................................. G06F 9/44505
See application file for complete search history.

(56) References Cited

U.S. PATENT DOCUMENTS

| | | |
|---|---|---|
| 4,307,791 A | 12/1981 | De Bruine |
| 4,658,928 A | 4/1987 | Seo |

(Continued)

FOREIGN PATENT DOCUMENTS

| | | |
|---|---|---|
| EP | 1103351 | 5/2001 |
| GB | 2385238 | 8/2003 |

(Continued)

OTHER PUBLICATIONS

Valk, L., "Lego Mindstorms NXT 2.0 Discovery Book: A Beginner's Guide to Building and Programming Robots", 2010, pp. 27, 99, 244, 277-279, 312, 314, 316, 319-347.

(Continued)

*Primary Examiner* — Xuxing Chen
(74) *Attorney, Agent, or Firm* — Fish & Richardson P.C.

(57) ABSTRACT

A closed-loop service, referred to as an Adaptive Data Analytics Service (ADAS), characterizes the performance of a system or systems by providing information describing how users or agents are operating the system, how the system components interact, and how these respond to external influences and factors. The ADAS then builds models and/or defines relationships that can be used to optimize performance and/or to predict the results of changes made to the system(s). Subsequently, this learning provides the basis for administering, maintaining, and/or adjusting the system(s) under study. Measurement can be ongoing, even after the operating parameters or controls of a system under the administration or monitoring of the ADAS have been adjusted, so that the impact of such adjustments can be determined. This recursive process of observation, analysis, and adjustment provides a closed-loop system that affords adaptability to changing operating conditions and facilitates self-regulation and self-adjustment of systems.

26 Claims, 12 Drawing Sheets

(51) Int. Cl.

| | | |
|---|---|---|
| *G06F 9/445* | (2018.01) | |
| *G06F 11/34* | (2006.01) | |
| *G06F 11/30* | (2006.01) | |
| *G06N 3/08* | (2006.01) | |
| *G06N 99/00* | (2010.01) | |

(52) U.S. Cl.
CPC ...... *G06F 11/3447* (2013.01); *G06F 11/3452* (2013.01); *G06F 11/3466* (2013.01); *G06N 3/08* (2013.01); *G06N 99/005* (2013.01)

(56) References Cited

U.S. PATENT DOCUMENTS

| | | | |
|---|---|---|---|
| 5,203,733 | A | 4/1993 | Patch et al. |
| 5,361,186 | A | 11/1994 | Tanie et al. |
| 5,452,901 | A | 9/1995 | Nakada et al. |
| 5,697,829 | A | 12/1997 | Chainani et al. |
| 5,989,096 | A | 11/1999 | Barton et al. |
| 6,012,957 | A | 1/2000 | Cyrus et al. |
| 6,157,872 | A | 12/2000 | Michael |
| 6,254,478 | B1 | 7/2001 | Namanny et al. |
| 6,477,444 | B1 | 11/2002 | Bennett et al. |
| 6,491,566 | B2 | 12/2002 | Peters et al. |
| 6,636,781 | B1 | 10/2003 | Shen et al. |
| 6,695,668 | B2 | 2/2004 | Donahue et al. |
| 6,725,128 | B2 | 4/2004 | Hogg et al. |
| 6,783,425 | B2 | 8/2004 | McKeefery |
| 6,790,045 | B1* | 9/2004 | Drimmer ............... G09B 7/00 434/336 |
| 6,842,246 | B2 | 1/2005 | Roufas et al. |
| 6,991,945 | B1* | 1/2006 | Castle .................. H01L 22/20 257/E21.525 |
| 7,076,331 | B1 | 7/2006 | Nagatsuka et al. |
| 7,097,532 | B1 | 8/2006 | Rolicki et al. |
| 7,753,756 | B2 | 7/2010 | McDermott et al. |
| 7,787,990 | B2 | 8/2010 | Pietrzyk |
| 8,160,994 | B2 | 4/2012 | Ong et al. |
| 8,287,372 | B2 | 10/2012 | Hong et al. |
| 8,353,737 | B2 | 1/2013 | Sofman et al. |
| 8,666,547 | B2 | 3/2014 | Cheung et al. |
| 8,851,953 | B2 | 10/2014 | Oschuetz et al. |
| 2002/0102910 | A1 | 8/2002 | Donahue et al. |
| 2002/0115373 | A1 | 8/2002 | Lazerman |
| 2002/0137427 | A1 | 9/2002 | Peters et al. |
| 2003/0060287 | A1 | 3/2003 | Nishiyama |
| 2003/0097203 | A1 | 5/2003 | Michael |
| 2003/0109958 | A1 | 6/2003 | Hogg et al. |
| 2003/0148698 | A1 | 8/2003 | Koenig |
| 2003/0232649 | A1 | 12/2003 | Gizis et al. |
| 2004/0032420 | A1 | 2/2004 | Allen et al. |
| 2004/0068415 | A1 | 4/2004 | Solomon |
| 2004/0134336 | A1 | 7/2004 | Solomon |
| 2004/0134337 | A1 | 7/2004 | Solomon |
| 2004/0162638 | A1 | 8/2004 | Solomon |
| 2004/0210347 | A1 | 10/2004 | Sawada et al. |
| 2004/0266506 | A1 | 12/2004 | Herbrich et al. |
| 2005/0186884 | A1 | 8/2005 | Evans |
| 2006/0073760 | A1 | 4/2006 | Tremel et al. |
| 2006/0073761 | A1 | 4/2006 | Weiss et al. |
| 2006/0074603 | A1 | 4/2006 | Matsunaga et al. |
| 2006/0095159 | A1 | 5/2006 | Desmond |
| 2006/0223637 | A1 | 10/2006 | Rosenberg et al. |
| 2007/0017984 | A1 | 1/2007 | Mountz et al. |
| 2007/0021863 | A1 | 1/2007 | Mountz et al. |
| 2007/0021864 | A1 | 1/2007 | Mountz et al. |
| 2007/0173171 | A1 | 7/2007 | Pal Benedek et al. |
| 2007/0173177 | A1 | 7/2007 | Hirokawa et al. |
| 2007/0293124 | A1 | 12/2007 | Smith et al. |
| 2008/0026671 | A1 | 1/2008 | Smith et al. |
| 2008/0108277 | A1 | 5/2008 | Nunez Serrano et al. |
| 2009/0004948 | A1 | 1/2009 | Ando et al. |
| 2009/0076784 | A1 | 3/2009 | Ong et al. |
| 2009/0089333 | A1 | 4/2009 | Kobayashi |
| 2009/0111356 | A1 | 4/2009 | Haass et al. |
| 2009/0265642 | A1 | 10/2009 | Carter et al. |
| 2009/0284553 | A1 | 11/2009 | Seydoux |
| 2010/0093255 | A1 | 4/2010 | Yamamoto |
| 2010/0099493 | A1 | 4/2010 | Horovitz |
| 2010/0178966 | A1 | 7/2010 | Seydoux |
| 2010/0203933 | A1 | 8/2010 | Eyzaguirre et al. |
| 2010/0230198 | A1 | 9/2010 | Frank et al. |
| 2010/0304640 | A1 | 12/2010 | Sofman et al. |
| 2011/0288660 | A1* | 11/2011 | Wojsznis ............ G05B 23/024 700/30 |
| 2012/0169879 | A1* | 7/2012 | Libal ................... G06Q 10/063 348/150 |
| 2012/0238366 | A1 | 9/2012 | Tedder |
| 2013/0190090 | A1 | 7/2013 | Lin |
| 2013/0282314 | A1 | 10/2013 | Budhraja et al. |
| 2014/0012593 | A1* | 1/2014 | Kim ..................... G06F 19/345 705/2 |
| 2014/0278459 | A1 | 9/2014 | Morris |

FOREIGN PATENT DOCUMENTS

| | | |
|---|---|---|
| JP | 7016348 | 1/1995 |
| JP | 2001022264 | 1/2001 |
| JP | 2005185655 | 7/2005 |
| WO | 2008039934 | 4/2008 |
| WO | 2009037677 | 3/2009 |

OTHER PUBLICATIONS

Zlot, Robert et al., "Multi-Robot Exploration Controlled by a Market Economy", 2009 IEEE, 9 pages.

* cited by examiner

ADAPTIVE DATA ANALYTICS SERVICE

CROSS-REFERENCE TO RELATED APPLICATIONS

The present application claims priority from U.S. Provisional Application Ser. No. 62/099,749 for "Adaptive Data Analytics Service", filed Jan. 5, 2015, which is incorporated herein by reference.

The present application is related to U.S. Utility application Ser. No. 12/788,605 for "Distributed System of Autonomously Controlled Toy Vehicles", filed on May 27, 2010 and issued as U.S. Pat. No. 8,353,737 on Jan. 15, 2013, which is incorporated herein by reference.

The present application is further related to U.S. Utility application Ser. No. 13/963,638 for "Integration of a Robotic System with One or More Computing Devices", filed on Aug. 9, 2013 and issued as U.S. Pat. No. 8,882,560 on Nov. 11, 2014, which is incorporated herein by reference.

The present application is further related to U.S. Utility application Ser. No. 14/291,513 for "Mobile Agents for Manipulating, Moving, and/or Reorienting Components", filed on May 30, 2014 and issued as U.S. Pat. No. 9,155,961 on Oct. 13, 2015, which is incorporated herein by reference.

TECHNICAL FIELD

The present disclosure relates to systems and methods for performing data analytics relating to physical systems.

BACKGROUND

The field of data analytics has grown tremendously in recent years. With an ever-increasing proliferation of affordable technologies capable of collecting and reporting data, coupled with an also ever-increasing ability to process data cheaply, the role that data and data analysis plays in identifying trends and improving decision-making processes is also growing both in use and importance to many facets of industry, commerce, and research. Sophisticated data analytics are commonly used in a broad range of fields such as marketing, insurance, telecommunications, healthcare, and pharmaceuticals. Typically, the desired result of these efforts is a predictive tool that serves the primary interest at hand, such as a well-formed question or specific target of study. Often, it is left to researchers or users to decide when and how to apply what is learned. In that sense, analytics systems are typically disconnected from the processes and systems they study, since they are not generally disposed to automatically acting on the analyses they perform. This is particularly the case when analytics systems aggregating multiple data streams are applied to systems operating in the physical world. In general, analytics systems have not been employed as administrative tools in which the products of their evaluation processes would be automatically applied to the system or systems under study.

SUMMARY

According to various embodiments, the method and system described herein implement an Adaptive Data Analytics Service (ADAS). An ADAS is a closed-loop service that characterizes the performance of a system or systems by providing information describing how users or agents are operating the system, how the system components interact, and how these respond to external influences and factors. The ADAS then builds models and/or defines relationships that can be used to optimize performance and/or to predict the results of changes made to the system(s). Subsequently, this learning provides the basis for administering, maintaining, and/or adjusting the system(s) under study.

In an ADAS constructed according to the techniques described herein, measurement can be ongoing, even after the operating parameters or controls of a system under the administration or monitoring of the ADAS have been adjusted. The result is that adjustments made to a system are scrutinized for their impact on system performance. This recursive process of observation, analysis, and adjustment provides a closed-loop system that affords adaptability to changing operating conditions and provides greater ability for systems to be self-regulating and self-adjusting.

BRIEF DESCRIPTION OF THE DRAWINGS

The accompanying drawings illustrate several embodiments and, together with the description, serve to explain various principles according to the embodiments. One skilled in the art will recognize that the particular embodiments illustrated in the drawings are merely exemplary, and are not intended to limit scope.

DETAILED DESCRIPTION

Figure 1:
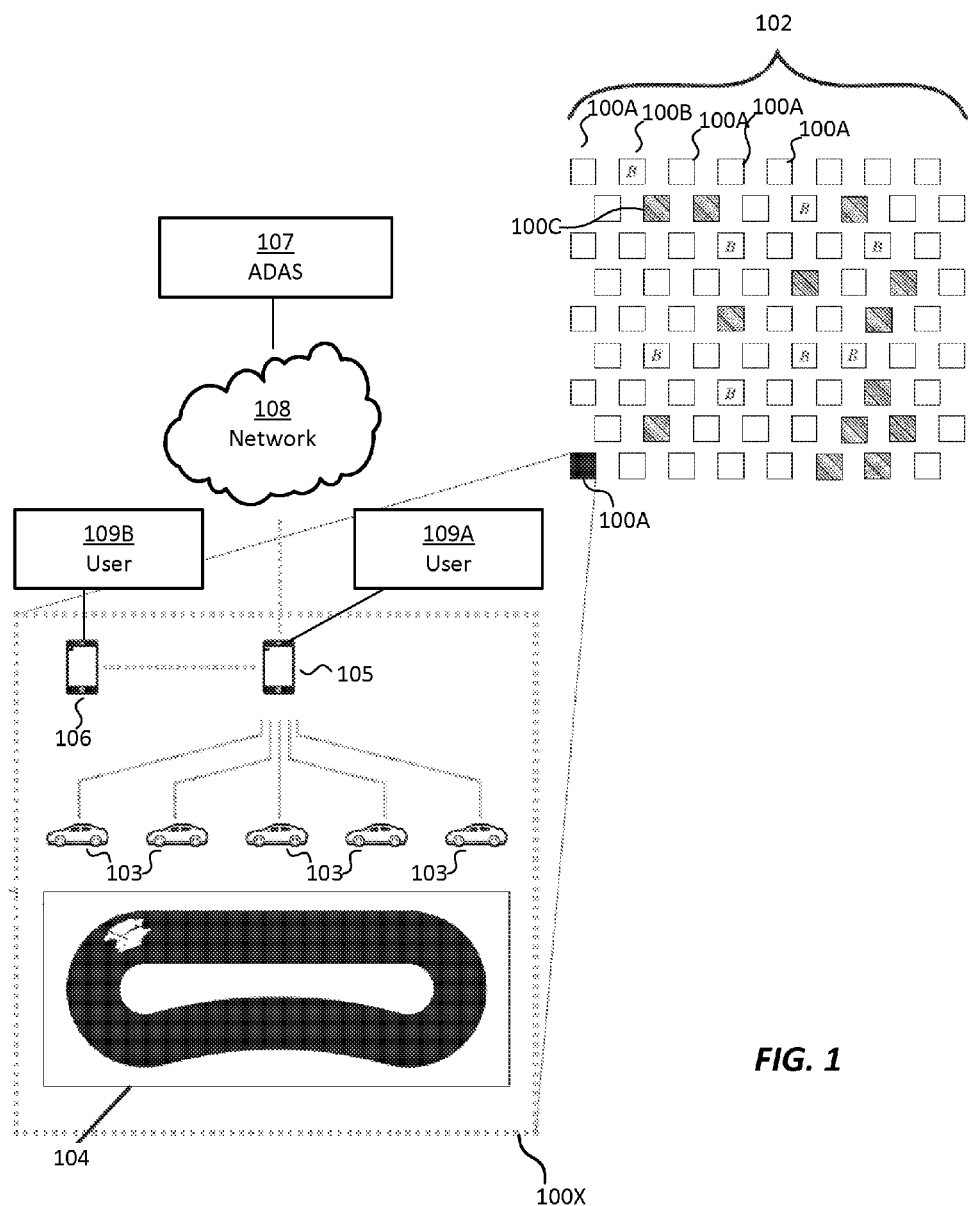
FIG. 1 is a block diagram depicting an implementation of an Adaptive Data Analytics Service (ADAS) in connection with a number of vehicles traveling on a track as part of a racing game, according to one embodiment.

The system described herein has broad applicability in many contexts, and can be used in any environment where it may be beneficial to perform monitoring and administration functions that provide data regarding different aspects of a system's status and performance. In the following discussion, the system is described in terms of an embodiment applied to monitoring some or all of the functioning portions of a series of mobile agents operating in a physical environment, such as toy vehicles traveling along a track. However, one skilled in the art will recognize that such an embodiment is merely exemplary, and that the discussion herein is in no way intended to suggest limits to which the system can serve to monitor and administrate a system or a population of systems.

Accordingly, in at least one embodiment, the described system is configured to monitor and maintain hardware systems in use, such as those described in the above-referenced related applications. However, the description is merely exemplary, and should not be taken to imply that the described system can only be implemented in such a context. To the contrary, one skilled in the art will recognize that the described system has wide applicability in other contexts as well.

For illustrative purposes, the system will be described herein primarily in the context of an analytics service as applied to a toy car racing game in which mobile agents (such as toy vehicles), which may operate autonomously, semi-autonomously, and/or under user control, compete on a physical track such as a road circuit. The vehicles are wirelessly connected to a host device, such as a smartphone or similar mobile computing device that orchestrates their movement either through software algorithms and/or by responding to control commands from peer mobile devices. Further details regarding the implementation of such a system, and its mechanisms for integrating virtual and physical environments, are set forth in U.S. Utility application Ser. No. 12/788,605 for "Distributed System of Autonomously Controlled Toy Vehicles", filed on May 27, 2010 and issued as U.S. Pat. No. 8,353,737 on Jan. 15, 2013, which is incorporated herein by reference in its entirety; and U.S. Utility application Ser. No. 13/963,638 for "Integration of a Robotic System with One or More Computing Devices", filed on Aug. 9, 2013 and issued as U.S. Pat. No. 8,882,560 on Nov. 11, 2014, which is incorporated herein by reference in its entirety. However, one skilled in the art will recognize that the techniques described herein can be implemented in other contexts and environments, and need not be limited to toy vehicles on a physical track. The term "vehicle" as used herein shall therefore be taken to extend to any mobile agent that is capable of being controlled and operated in the manner described herein.

Although the system is described herein primarily in the context of an application in entertainment, one skilled in the art will recognize that the system can be implemented in many other contexts, including contexts that are not necessarily related to entertainment.

System Architecture

Referring now to FIG. 1, there is shown a block diagram depicting an implementation of an adaptive data analytics service 107 in connection with a system 100 in which a number of vehicles 103 travel on a track 104 as part of a racing game, according to one embodiment. As shown in FIG. 1, system 100X can be one of a population 102 of peer systems 100 (referred to herein as "cell systems 100", including cell systems 100A, 100B, and 100C) that bear some consistency with each other in terms of general makeup. The various cell systems 100 can be implemented at different locations, if appropriate. The difference between cell systems 100A, 100B, and 100C is described in more detail below.

In at least one embodiment, cell system 100X includes, for example, five vehicles 103 and track 104 upon which they navigate. Vehicles 103 connect to host computing device 105, which may be a conduit for data sent from vehicles 103 and also may be a source of use-related data itself. One or more of the vehicles may be controlled by a human user 109B, using another computing device 106, connecting through host device 105 separately, and host device 105 may control the remaining vehicles 103 under any of a number of different control schemes. In at least one embodiment, host device 105 may also be controlled by a human user 109A. Any number of devices 106 may be provided, each operated by a different user 109. Further details and variations are provided in the above-referenced related U.S. Utility Patent Applications.

In at least one embodiment, ADAS 107 is implemented on a server or other electronic device (or in a distributed manner using a plurality of electronic devices), configured to communicate with host device 105 via any suitable electronic network 108, such as the Internet. In at least one embodiment, ADAS 107 monitors and administers any number of cell systems 100 in the manner described herein.

Each cell system 100 can provide multiple feeds of data to ADAS 107. For example in cell system 100X, each vehicle 103 may report information regarding its own performance, from low-level function data related to aspects of its components' functions to high-level information that may be relayed to host device 105 as part of the system's 100 operation. In at least one embodiment, host device 105, as well as any devices connected to host device 105 (such as vehicles 103), provide ADAS 107 with data that can be used for analysis. Additional data can be collected from other sources, if desired.

Such data received by ADAS 107 can include, for example: static information such as unique device identifications, user identifiers, and/or type of game played; dynamic information capturing changing states such as actions executed by the vehicles/users 109 during a game with the corresponding times at which they occurred; and/or data external to system 100 such as geographic location. One skilled in the art will appreciate that these are only examples of some of the types of data that may be uploaded to ADAS 107. Such information may be sent in real-time to ADAS 107, or it can be stored (on device 105, for example, or any other suitable device) for later uploading.

The magnitude of information collected by ADAS 107 can be quite large, particularly when ADAS 107 is administrating a population of cell systems 100. In at least one embodiment, ADAS 107 may start analyzing data to find correlations or develop models as soon as data collection begins. As the volume of data increases, the statistical significance of any resulting evaluations also increases.

In various embodiments, ADAS 107 uses different methodologies and mechanisms to build models that characterize a cell system 100 and/or for establishing relationships or correlations among types of data collected by ADAS 107. In some instances, correlations establishing relationships among incoming data may prompt ADAS 107 to define relationship parameters in empirical or other terms as dictated through pre-configuration, rather than directing ADAS 107 to process multiple types of data for correlation without such predisposition. Any type of pre-configuration can be used, depending for example on the nature of cell system 100 for which data is being collected.

For example, for a cell system 100 as described in the above-referenced applications, pre-configuration may include establishing relationships between current draw and corresponding motor speed, memory or battery faults, localization failures, and/or correlations of higher order (e.g., those related to game play and/or interactions among vehicles 103). Once pre-configured with these relationships, ADAS 107 may rely on such relationships as a starting point and use cell-specific data to adapt them to better describe the characteristics of the corresponding cell system 100. Various embodiments are broadly adaptable to operational contexts in which models and correlations characterize cell systems 100 under administration from the outset, and/or cell systems 100 in which ADAS 107 is tasked with developing the prevailing system models from the data received during cell system 100 use and activity. Any suitable method (or combination of methods) can be used in connection with ADAS's 107 analytical processes, including for example statistical analysis methods. For illustrative purposes, the present disclosure sets forth the system in connection with ADAS 107 configured to seek relationships with or without predetermination.

Figure 9:
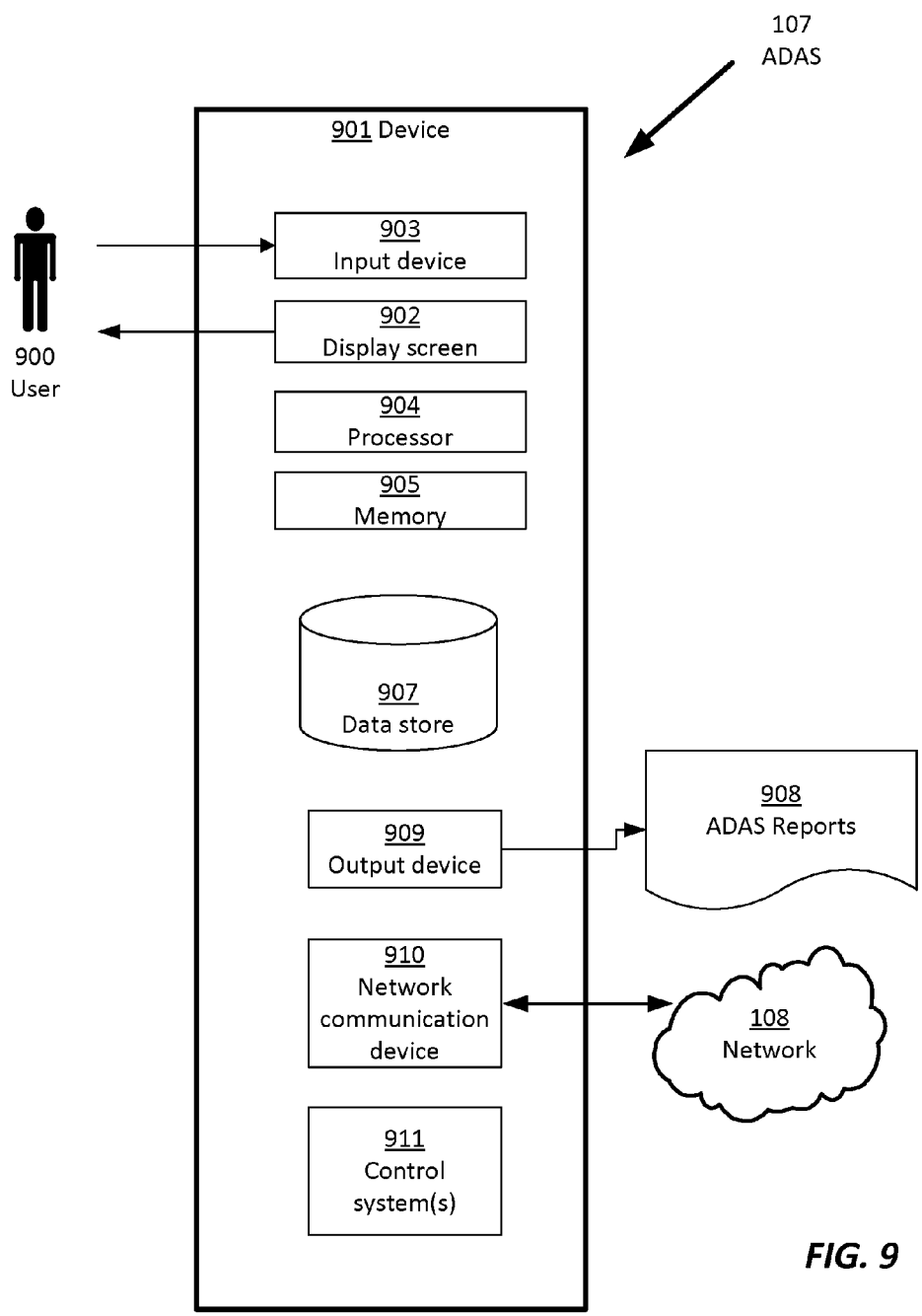
FIG. 9 is a block diagram depicting a hardware architecture for implementing an ADAS according to one embodiment.

Referring now to FIG. 9, there is shown a block diagram depicting a hardware architecture for implementing ADAS 107 according to one embodiment. Such an architecture can be used, for example, for implementing ADAS 107 in a device 901 such as a computing device or other electronic device (such as a server) running software.

In at least one embodiment, device 901 has a number of hardware components well known to those skilled in the art. Input device 903 can be any element that receives input from user 900, such as for example a touchscreen, keyboard, mouse, dial, wheel, button, trackball, stylus, or the like, or any combination thereof. User 900 can be a system administrator, operator, or other user interacting with ADAS 107. User 900 can be one of the users 109 of a cell system 100, or may be a different user entirely. In at least one embodiment, input device 903 can also receive speech input or any other form of input.

Processor 904 can be a conventional microprocessor for performing operations on data under the direction of software, according to well-known techniques. Memory 905 can be random-access memory, having a structure and architecture as are known in the art, for use by processor 904 in the course of running software.

Data store 907 can be any magnetic, optical, or electronic storage device for data in digital form; examples include flash memory, magnetic hard drive, CD-ROM, or the like. Data store 907 can be used for storing operational and/or analytical data concerning cell system(s) 100 (referred to herein as ADAS reports 908) and/or the like, either temporarily or permanently, and can also be used for storing other information used in generating ADAS reports 908. Network communication device 910 is any suitable electronic component for enabling communications via network 108.

Device 901 can also include output device 909, for outputting or transmitting ADAS reports 908 and/or any other information concerning the operation of cell system(s) 100. Output device 909 may be, for example, a display screen or any other element that displays or outputs information, which can include ADAS reports 908. Such output device 909 can be integrated into device 901, or can be a separate component such as a printer. In at least one embodiment, device 901 can also include control system(s) 911 and/or other component(s) for controlling and/or adjusting operation of cell system(s) 100, for example by controlling operation of vehicle(s) 103, issuing alerts, and/or the like, as described below.

In at least one embodiment, ADAS 107 can also be implemented in a client/server environment or distributed computing environment. In such environments, any or all of the components shown in FIG. 9 can be implemented in different computing devices that communicate with one another over a network such as the Internet. Known protocols are used for implementing such interaction among components. Any suitable type of communications network, such as the Internet, can be used as the mechanism for transmitting data among the various components. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, components of the system can include network communications interfaces for enabling communication with other components via the electronic network. Other architectures are also possible.

In at least one embodiment, such a system can be implemented in a web-based context, wherein user 900 controls operation of the system via a web browser that interacts with web pages provided by a web server to provide the functionality described herein.

System Architecture

Figure 2:
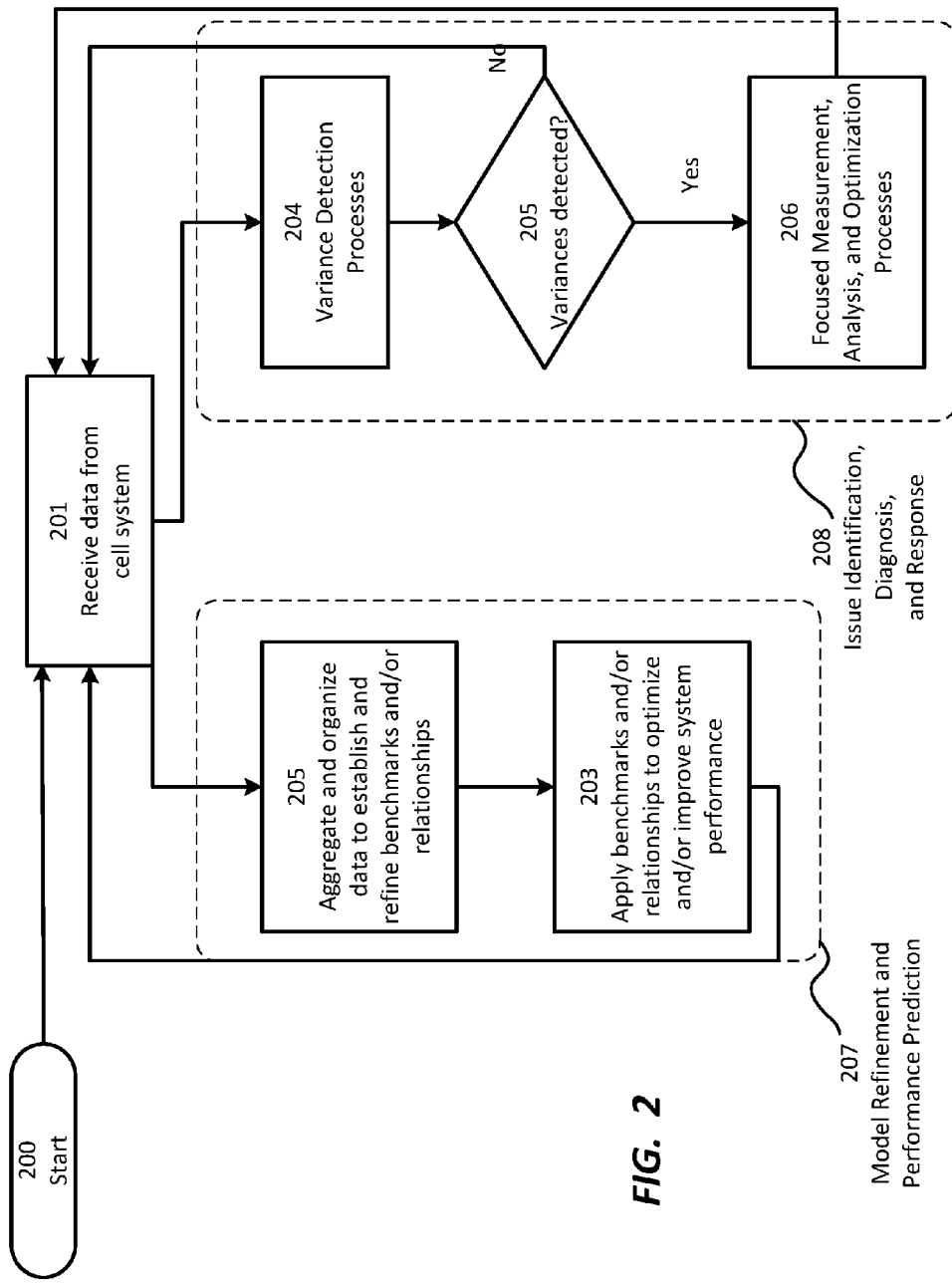
FIG. 2 is a flow diagram illustrating a process for collecting data and using such data to establish correlations that characterize a system or a population of systems, according to one embodiment.

Referring now to FIG. 2, there is shown a flow diagram illustrating a process for collecting data and using such data to establish correlations that characterize a cell system 100 or a population of cell systems 100, according to one embodiment. The diagram also illustrates mechanisms for using new data to refine or further develop relationships and/or to detect variances in performance that may indicate a potential operational issue or problem.

In at least one embodiment, the method of FIG. 2 may be performed by ADAS 107 constructed using an architecture such as that described above in connection with FIG. 9, operating within an implementation such as that described above in connection with FIG. 1. However, one skilled in the art will recognize that the method of FIG. 2 may be implemented in other contexts and systems as well.

The method begins 200. Data is received 201 from a cell system 100 being monitored and/or administered by ADAS 107. In the example depicted in FIG. 1, host device 105 may collect data from other components such as device 106 and/or vehicles 103, and may then send collected data to ADAS 107. This information is forwarded to two modules: model refinement and performance prediction module 207; and issue identification, diagnosis, and response module 208. Module 207 aggregates 202 and organizes the received data to establish and refine performance benchmarks and/or relationships. Information from these benchmarks and/or relationships is then applied 203 to optimize and/or improve system performance under prevailing conditions. Steps 202 and 203 thus provide mechanisms by which models of system operation can be generated and used for predicting future performance and/or actions, as well as for detecting variances. Data from step 203 can be fed back into the system (step 201), forming an iterative analytical method.

Once module 207 has sufficiently developed and refined the performance model, module 208 can use such information to determine whether (and by how much) actual system performance varies from what the models predict. Any suitable variance detection process(es) 204 can be used to detect such variations. If, in step 205, variances are detected, step 206 is performed, in which focused measurement, analysis, and optimization process(es) are invoked to identify the source of the variance and to enact a response intended to correct a problem or compensate for any apparent performance issues. For example, operational parameters of system components can be adjusted to compensate for the variances. Such a response may be termed an "inline response" since it can be internally selected by ADAS 107, potentially with some additional suitable development, tailoring or refinement and executed without intervention beyond ADAS 107. Data from steps 205 and/or 206 can be fed back into the system (step 201), forming an iterative analytical method.

Thus, as shown in FIG. 2, incoming data from step 201 can be used by the system to serve two parallel processes, one identified with model refinement and performance prediction module 207, and the other identified with issue identification, diagnosis, and response module 208 to identify deviation outside the norms established by the models. In at least one embodiment, both modules 207 and 208 are implemented as functional components of ADAS 107.

Advance Replacement

One skilled in the art will recognize that ADAS 107 can be used to collect and analyze many different types of data from cell system(s) 100 and to perform any suitable type of optimization and/or adjustment(s) based on such analysis. The following example describes an application for model refinement and performance prediction in which the failure of a component within a system (such as a cell system 100) can be predicted, so that the component can be replaced prior to the occurrence of the failure. In this example, detection of a variance in performance initiates diagnostics and subsequently invokes a response to correct the issue without the need to notify system users 109 and without disrupting operation of system 100.

In such an application of the ADAS 107 techniques described herein, ADAS 107 generates predictions of events such as system failure, with the understanding that advance knowledge of such an event is a critical element in preempting it.

Figure 3A:
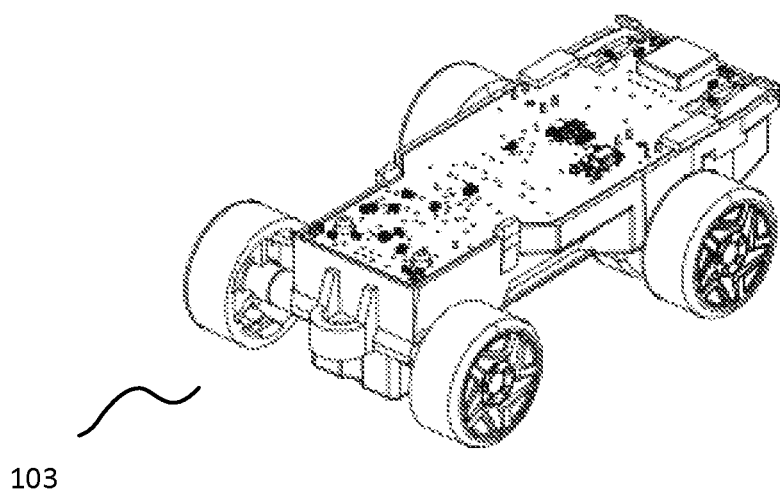
FIG. 3A illustrates an example of a vehicle that can be used as one of the vehicles in the example system of FIG. 1.
Figure 3B:
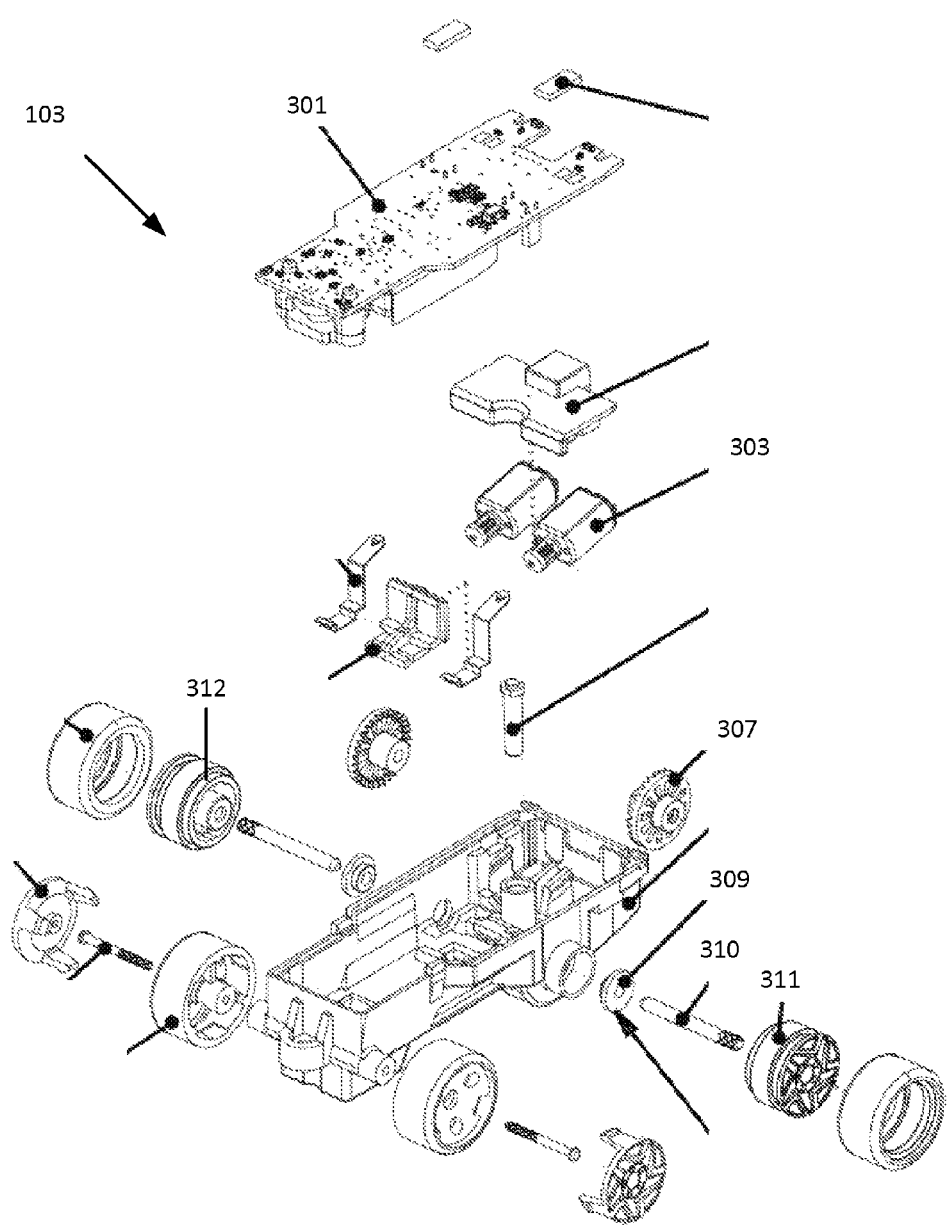
FIG. 3B is an exploded diagram revealing the internal parts of such a vehicle according to one embodiment.

Referring now to FIG. 3A, there is shown an example of a vehicle 103 as may be used as one of the vehicles in the example system depicted in FIG. 1. Referring now also to FIG. 3B, there is shown an exploded diagram revealing the internal parts of vehicle 103 according to one embodiment. Motors 303, which provide mechanical power to drive vehicle 103, are connected to a gear and axle subassembly 307, 309, 310 that turns rear wheels 311, 312 of vehicle 103. Additional components depicted in FIG. 3B are described in more detail below.

In at least one embodiment, ADAS 107 may analyze the wear and aging of a component such as motor 303 so as to predict failure and to take appropriate corrective and/or preventative action. A rudimentary approach to predicting failure in motor 303 might rely on reference to the motor manufacturer's specification as to the part's expected lifetime. Often, such a lifetime rating is based on certain operational conditions and a reduction factor intended to assure reliable performance to a minimum threshold. Such a rating can be used, with some adjustment as may be appropriate, to track motor use as a cumulative portion of a predicted total lifetime. However, the result of such analysis may, in some situations, have limited accuracy in predicting failure due to age, since the manner in which motor 303 is used bears significant impact on its total useful life.

Accordingly, in at least one embodiment, ADAS 107 collects and uses data streams regarding motor use and performance as a basis for building models that lend themselves to more accurate predictions. In at least one embodiment, ADAS 107 monitors and administrates a population of cell systems 100 so as to develop statistically robust models more quickly.

Figure 3C:
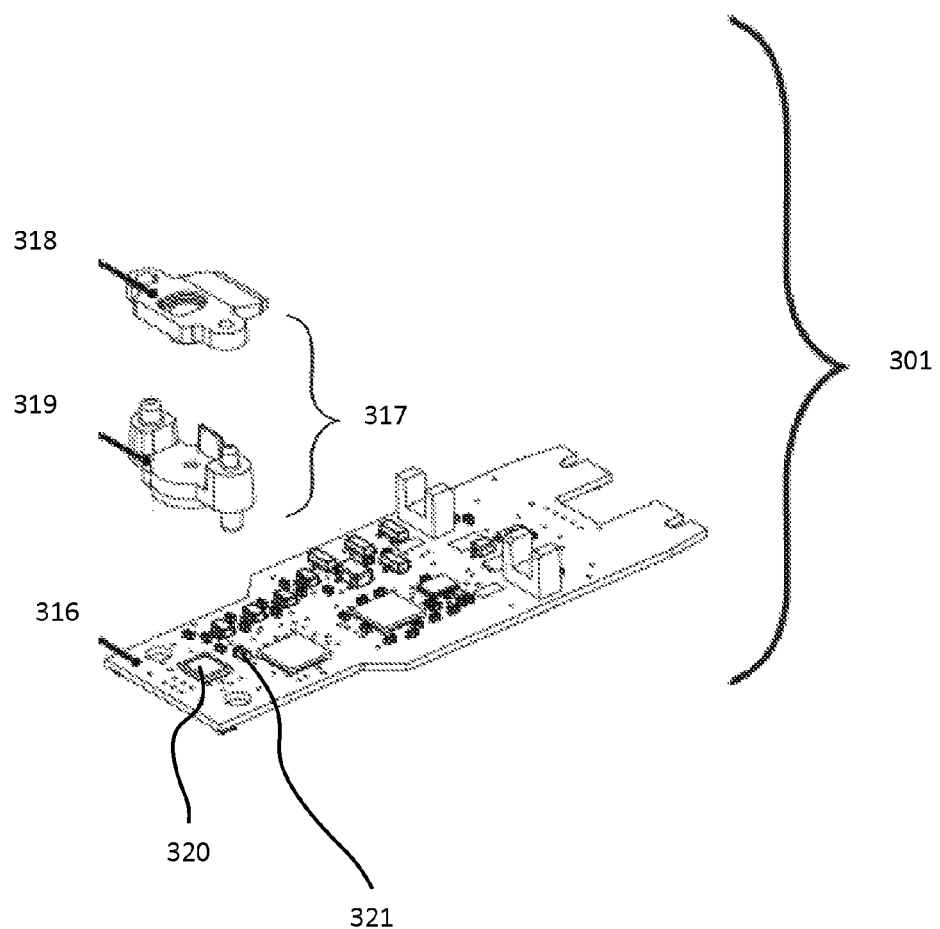
FIG. 3C is an exploded diagram revealing the internal parts of a printed circuit board assembly for use in such a vehicle according to one embodiment.
Figure 4:
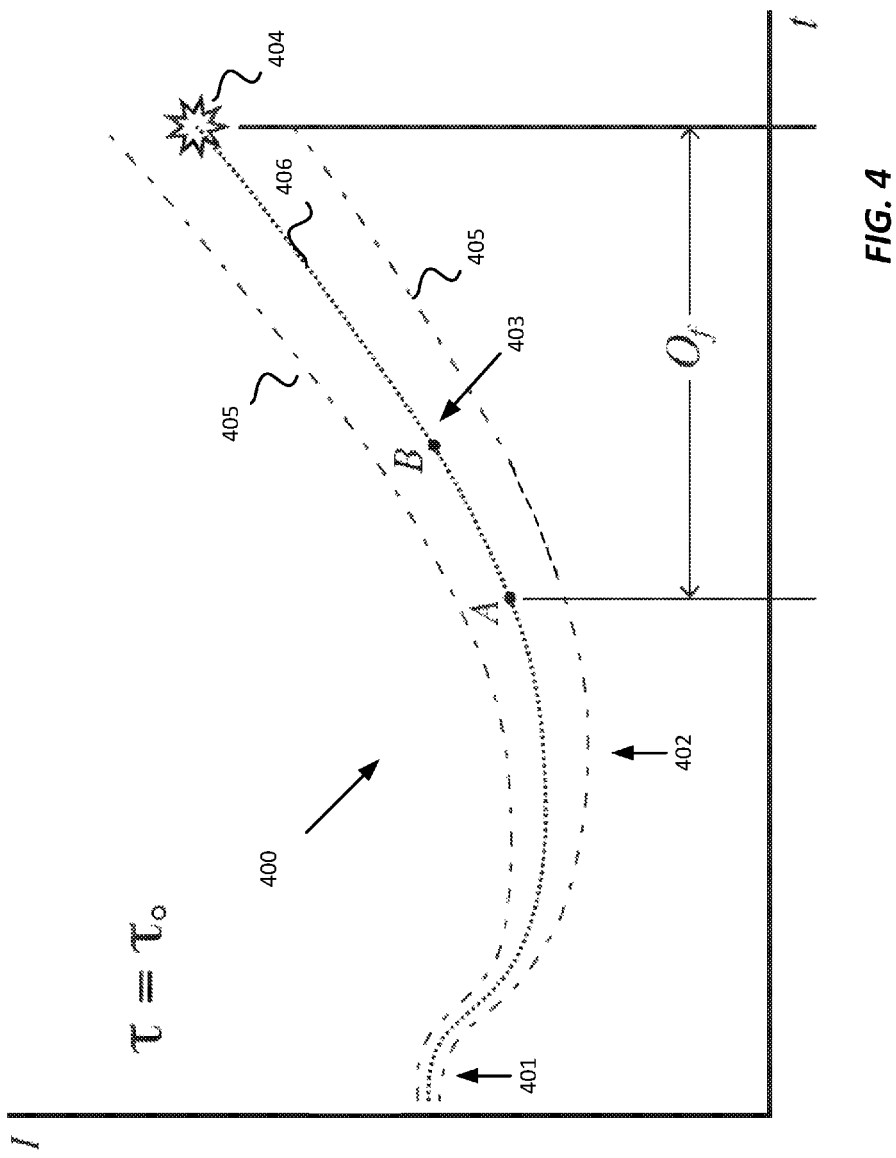
FIG. 4 is a graph depicting how the electrical current necessary to drive a motor at a constant torque can change over time.

Referring now to FIG. 4, there is shown a graph 400 depicting how the electrical current I necessary to drive motor 303 configured in the mechanical assembly shown in FIG. 3 at a constant torque ($\tau_o$) can change with time t (hours of use, for example). In graph 400, the current draw may be steady for a short period of time 401 before declining, a phenomenon often seen in new gears as they wear together. After the mechanical system's break-in period, the current draw necessary to sustain constant torque is again constant for a period of use 402. Beyond a certain usage, however, the current necessary to sustain starts to increase 403 as motor 303 ages. This growth in current draw increases until motor 303 fails at time 404. In at least one embodiment, ADAS 107 develops and determines the correlation between electrical current and motor use, as shown in graph 400, as ADAS 107 receives use data from motors 303 operating within vehicles 103 running within cell systems 100.

In at least one embodiment, ADAS 107 gathers data from a single cell system 100 in use or from a population of multiple cell systems 100 in use. Using this information, ADAS 107 develops specifically tailored correlations and/or models to characterize how cell systems 100 (and their components) are performing. For example, in order to develop the relationship depicted in graph 400 of FIG. 4, raw data can be collected from multiple vehicles 103 with the same electro-mechanical design, so as to determine current draw in motors 303 of such vehicles 103 under a specific torque, which may be established by proxy. For example, data can be collected based on current necessary to sustain a particular velocity while traveling in a straight line over a set distance. Data can be collected for vehicles 103 belonging to a single cell system 100 or multiple cell systems 100. Any suitable mechanism can be used for aggregating data collected from multiple cell systems 100. The greater the population of vehicles 103 from which data is collected, the more quickly a useful correlation (or other relationship) may be developed, and the more reliable such a correlation may be.

In at least one embodiment, ADAS 107 also collects peripheral data to characterize the relevant elements of a correlation and thereby provide additional indications of accuracy and reliability of data. For example, ADAS 107 can collect additional data to examine how a correlation may vary according to specific aspects of motor 303 (such as, for example, left or right position in the chassis, manufacturer, production lot number, how much time passed between when motor 303 was manufactured and when it entered service, how long motor 303 has been turning in its current operation, ambient temperature, and/or the like).

When predicting motor burn-out using a relationship as depicted in graph 400 of FIG. 4, the curve may have an inherent uncertainty relative to the degree of inherent variability in motor performance, as suggested by matching dashed lines 405 bounding curve 406. In at least one embodiment, ADAS 107 seeks to minimize uncertainty in its development of correlations and/or ascribe confidence metrics to such correlations. Any suitable mechanism can be used for determining such confidence metrics, such as for example by performing statistical analysis based on the amount of data collected and the number of data sources (vehicles 103 and/or cell systems 100) involved.

In at least one embodiment, ADAS 107 generates and develops performance correlations as illustrated in FIG. 4 in the context of an ongoing background process. Data is channeled into ADAS 107 during normal operation, and ADAS 107 aggregates and organizes data as part of its analysis processes.

In some cases, the system can be configured so that capture of data requires specific action from one or more component parts of a cell system 100, for example to maintain consistency in measurement conditions. For example, such a situation may arise if there is a need to assess current by a proxy of constant velocity on a straight course. In such a case, if the system is unable to gather the necessary information at an opportune moment of normal operation (e.g., while a vehicle 103 is travelling at a particular velocity), ADAS 107 may direct one or more vehicles 103 operating within one or more cell systems 100 to execute the motion necessary to capture the desired data. This can be done, for example, at the beginning or end of a formal use session when such action will not interfere with a user's 109 operation of device 106, vehicle 103, and/or cell system 100. Such action can be performed without notifying user 109 of the purpose; alternatively, a message can be generated to inform user 109 that system diagnostics or similar operational verifications are being performed.

As mentioned above, in at least one embodiment, the system collects data from several individual cell systems 100 of similar nature. While the various components (such as vehicles 103, tracks 104, and/or the like) may have similarities and may have been manufactured under the same general specifications, each set is an individual cell system 100 that can be supported by (and monitored by) ADAS 107. The greater the number of these individual cell systems 100 in use and providing information to ADAS 107, the more effective ADAS 107 is in providing optimal performance. By lending itself to administration across multiple similar cell systems 100, ADAS 107 provides distinct advantages over other systems.

As previously discussed, the effectiveness of ADAS 107 improves with an increasing population of similar elements under study (in this example, vehicles 103), whether or not the elements are distributed across multiple separate cell systems 100 or within a single cell system 100. Thus, in the information gathering stage, the greater the amount of data available, the faster statistically significant relationships can be identified and refined. In order to expedite collection of data, it may be beneficial to monitor a multitude of cell systems 100 simultaneously. In this manner, a potential performance issue can be diagnosed in one cell system 100 partly through tests conducted on one or more other cell systems 100. However, one skilled in the art will recognize that simultaneous collection of data across multiple cell systems 100 is not necessary, and the system can also operate without such simultaneous collection.

In the current example wherein operating life of motors 303 is being estimated, a tailored and refined model that relates electrical current draw to total elapsed hours of use may only be one part of the characterization used by ADAS 107 in determining when a motor 303 is nearing the end of its life and should be replaced. Another important consideration may be the utilization rate of motor 303. For a cell system 100 as described above, usage of motor 303 may follow a pattern often seen in consumer products in which the utility rate changes with time. Models based around consumer use are likely to encounter higher degrees of variability than do studies on a mass-manufactured component such as a motor 303 integrated into a mass-manufactured mechanical assembly. In this context, other factors can be taken into consideration, such as for example, demographic information of users 109, user age, location, time of day, number of peer users 109, time since first use, number of vehicles 103 in operation for a particular cell system 100, and/or the like. Any such factors may influence the utility rate of a particular vehicle 103 in a particular cell system 100, and may therefore be used in refining a predictive model. In the same manner that the system aggregates use data and seeks to find correlation among pertinent variables, an appropriate model of utility rate may emerge that serves to inform ADAS 107 of how much time will pass before a particular component (such as motor 303) will have logged a target amount of operating time.

Figure 5:
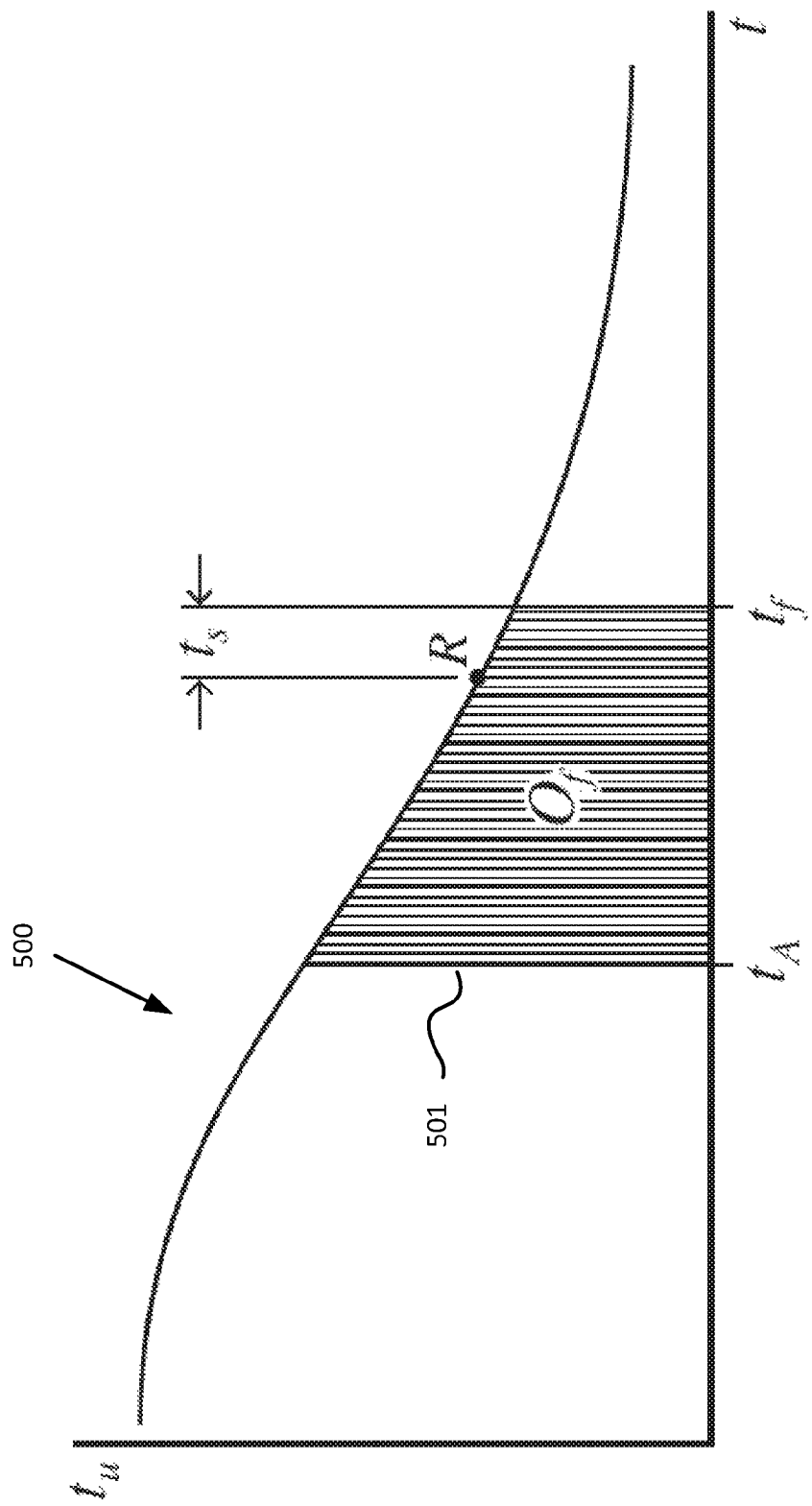
FIG. 5 is a graph depicting an example of a utility model for a component such as a vehicle of a cell system.

Referring now to FIG. 5, there is shown a graph 500 depicting an example of a utility model for a component such as a vehicle 103 of a cell system 100 as shown in FIG. 1. Graph 500 depicts a utility rate that declines with time in a nonlinear fashion, a pattern that indicates reduced user 109 engagement with time. This model can be combined with the correlation depicted in FIG. 4, to allow ADAS 107 to determine the optimal time to replace motor 303 of vehicle 103 as it approaches the end of its operating life.

An illustrative example is presented. Referring also to FIG. 4, suppose motor 303 is determined by its current-torque status to be at point A in its life. From the model depicted in graph 400, which describes the relationship between current-to-torque ratio and time, ADAS 107 can predict that motor 303 has a period of $O_f$ remaining in its life (the time between point A and predicted failure 404). The utility curve of graph 500 (FIG. 5) can thereby be employed to calculate how much actual time will pass from the current moment ($t_A$) until motor 303 has been used for a period of $O_f$, as depicted on the graph as the area 501 under the curve from current date $t_A$ until the expected failure date $t_f$.

In this scenario, the utility rate provides the basis for determining the actual time elapsed from now $t_A$ until the moment of failure $t_f$. Once this latter date is known, ADAS 107 can determine how much earlier a replacement should be provided. The date on which to ship a replacement is indicated as R in graph 500. It is the date of expected failure $t_f$ minus the time needed to provide for delivery ($t_s$). Once this replacement date R is determined, ADAS 107 can plan to notify user 109 (via host device 105 or via any other notification technique) that the unit in question should be replaced. In at least one embodiment, a replacement unit (either a motor 303, or a component that includes motor 303, or an entire vehicle 103) can be automatically shipped. In another embodiment, user 109 can be prompted or alerted to order a replacement.

One skilled in the art will recognize that the described scenario is merely one example that illustrates application of the system to a single failure mode of a single component (motor 303) in a vehicle 103 used in a cell system 100. However, the system can be applied in more complex contexts, so as to enable system modeling and performance predictions in a wide variety of situations, depending on the quantity, quality, and nature of data fed into ADAS 107. The more data is available, the more detailed and comprehensive the models and correlations underpinning ADAS's 107 administration of a system 100 or systems 100 can be. Any suitable factors can be taken into account; for example, when considering the time required to replace a unit such as motor 303, the cadence of weekly courier delivery can be a factor.

The described example illustrates advantages of the system over conventional customer care mechanisms for responding to issues. More particularly, in this example, the system provides a mechanism for minimizing the time between when an issue is reported or diagnosed, and when it is addressed. In addition, the system improves the efficiency with which user concerns are addressed, thus enhancing the user experience, particularly in situations where users 109 are experiencing a problem with a purchased product such as vehicle 103. In a customer service context, advance replacement scenarios have the potential to offer users 109 an experience that significantly improves upon current customer service norms. Beyond the fundamentally superior experience for a user 109 who might receive a replacement unit just before the current one fails, the cost to a company providing the advance replacement service is reduced by the elimination of an interaction with a customer support agent, potentially involving user assistance in a diagnosis process. In other words, the advance replacement paradigm provided by the present system avoids the need for user 109 to notice a problem and report it to customer support, prompting customer support to open a ticket and begin a diagnostic process. Moreover, the described system establishes goodwill by the timely tending of a problem that has yet to occur.

In this fashion, the system distinguishes itself from conventional techniques for remote monitoring of a system. The system, in various embodiments, provides mechanisms for developing models of system performance and for preemptively taking action to replace a part prior to its failure. The system improves upon existing techniques for remote monitoring of products, by making remote monitoring an active, ongoing service that need not necessarily rely on at least some part of a cell system 100 to conduct diagnostics locally. Rather, cell systems 100 may send data to ADAS 107 as directed or according to preconfiguration, and can respond to instructions to execute functional commands that are intended, for example, to yield additional operational data for interpretation within ADAS 107, as described above.

Accordingly, the described system can fundamentally alter the need for customer support to address performance problems with products by eliminating reliance on user 109 to observe and report potential issues once they have occurred. The system's continuous and recursive monitoring and analysis of operating data from hardware while it is in use provides a way to detect problems before they occur, and can also be used to tune systems that have drifted outside specifications in an unanticipated manner. The present system provides mechanisms for performing such operations automatically, with little or no user 109 involvement.

Remote Diagnostics and Response

As described previously, the example cell system 100 depicted in FIG. 1 includes any number of vehicles 103 traveling on track 104. In at least one embodiment, one component that supports successful navigation of vehicle 103 on track 104 is an imager that reads data encoded on track 104. Referring again to FIG. 3B, there is shown an exploded diagram revealing the internal components of vehicle 103 according to one embodiment.

One component shown in FIG. 3B is printed circuit board (PCB) assembly 301. Referring now also to FIG. 3C, there is shown an exploded diagram revealing the internal parts of PCB assembly 301, in an inverted orientation. In at least one embodiment, when operating properly, vehicle 103 reads codes (such as on track 104); firmware on vehicle 103 then decodes data encoded on such codes and transmits the decoded data back to host device 105. To perform such operations, in at least one embodiment, an infrared LED 321 directed through the underside of the vehicle chassis illuminates the portion of the tracks in the field of view of the camera imager chip 320 affixed to PCB 316 behind lens assembly 317 (which includes lens 318 and lens bracket 319). Camera imager chip 320 captures images of the passing track 104 (marked with encoded data) so that codes within the images can be decoded and interpreted. The decoded data, which can provide information relevant to determining the current position of vehicle 103, is then sent to host device 105, which may use the data, for example to update an overall model containing information of multiple vehicle locations, as described in the above-referenced related U.S. Utility Patent Applications.

If the process fails to yield decoded data or performs in a substandard manner, there are a number of possible reasons that might cause such failure. The system described herein provides mechanisms for automatic troubleshooting such a problem and, in some cases, applying an automatic remedy. In at least one embodiment, the system can also notify user 109 of the issue and the nature of the underlying problem, as well as compare data across multiple cell systems 100, vehicles 103, and/or users 109, to determine if there is a more fundamental or endemic problem requiring attention from the manufacturer of the part under scrutiny.

Because there are a number of elements involved in the decoding process (such as, for example, the track 104 that vehicle 103 is navigating, various components of vehicle 103 itself such as the camera imager chip 320, lens 318, and LED 321, as well as related systems such as power and computing needed to sustain overall functionality), there are a number of points of potential impairment or failure.

In at least one embodiment, when loss in performance occurs in the decoding process executed by a particular vehicle 103, processes within ADAS 107 that analyze collected data can identify that an issue has appeared (e.g., by detecting performance deviation in incoming data) and can begin running diagnostics on that specific vehicle 103, ideally without disrupting its operation.

Figure 6:
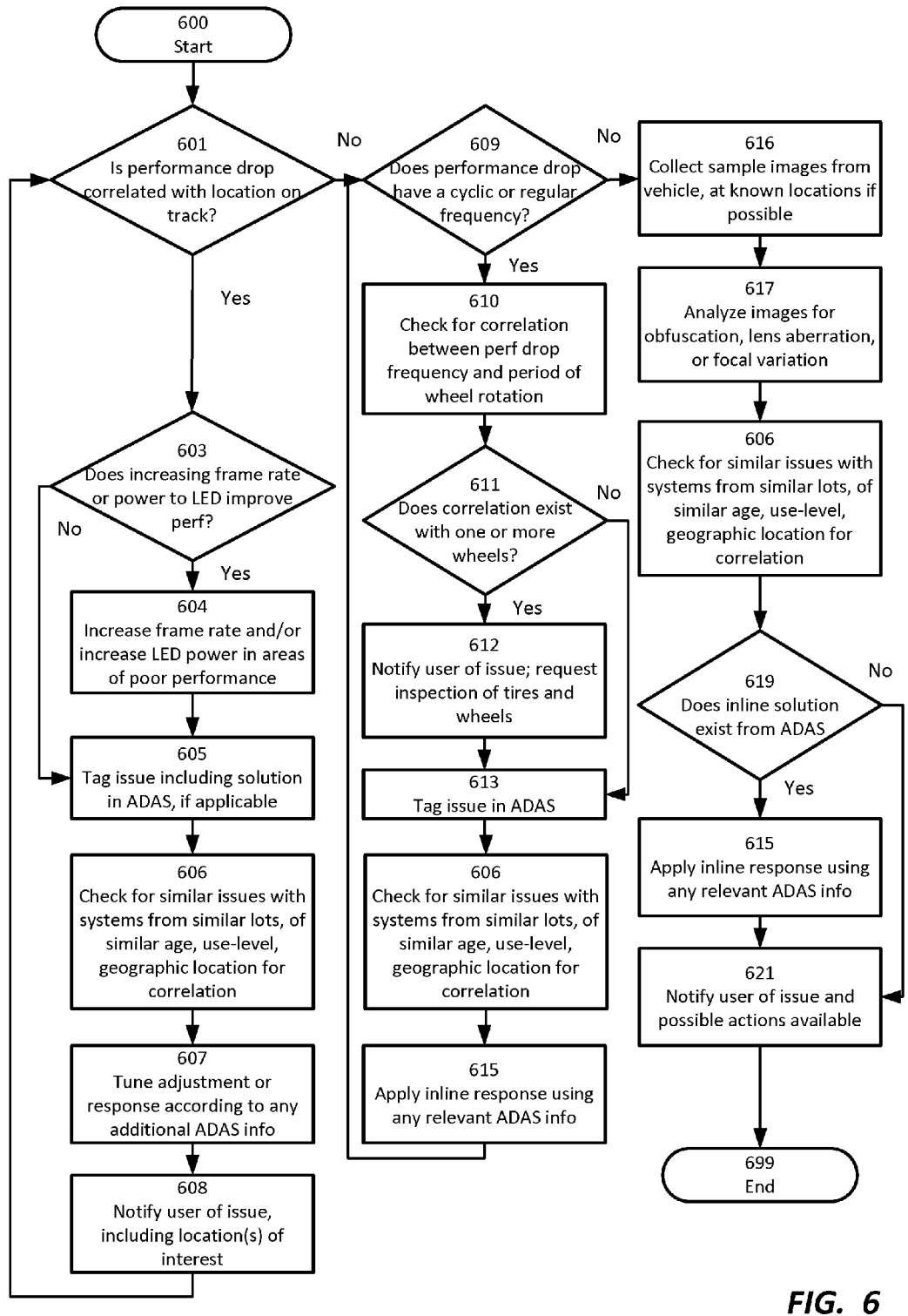
FIG. 6 is a flow diagram depicting a method of analysis performed by an ADAS for a vehicle in use in the field, according to one embodiment.

Referring now to FIG. 6, there is shown a flow diagram depicting a method of analysis performed by ADAS 107 for a vehicle 103 in use in the field, according to one embodiment. In at least one embodiment, when a potential issue or problem is detected related to decoding data, a process is followed, as illustrated in FIG. 6, that seeks to identify candidate sources of the problem.

In at least one embodiment, ADAS 107 can be preconfigured to follow a diagnostic process such as that identified in FIG. 6 and described in more detail below. ADAS 107 can be supported by a number of such diagnostic algorithms, each directed at monitoring a cell system 100 for potential performance issues and making adjustments as needed.

The method begins 600. In at least one embodiment, a change in performance might first be scrutinized to determine whether it varies during vehicle 103 operation. As depicted in the flow chart, a determination as made 601 as to whether the performance drop is correlated with a particular location on track 104. On a closed loop track 104, for instance, seeing performance vary in a consistent manner with a vehicle's 103 repetition of its course may indicate that the issue affecting the decoding process may be associated with a particular area of track 104.

If performance drop is correlated with a particular location on track 104, a determination is made 602 as to the spatial limits of the area(s) where performance is impaired. Impairment that correlates with location can be the result of any of a number of causes. For example, there could be foreign matter on track 104 that impairs reading the codes, or track 104 may have been damaged in one or more locations to the extent that the codes cannot be conveniently read in the manner intended.

ADAS 107 may have a schedule of potential corrections that, singly or in combination, enable vehicle 103 to address the issue. For example, a determination can be made 603 as to whether increasing the frame rate of the camera capturing images of the track and/or increasing the brightness of LED 321 illuminating track 104 improve performance. If so, frame rate can be increased 604 and/or LED 321 power increased in the areas of poor performance; either or both together can be implemented by, for example, transmitting appropriate instructions to vehicle 103 and/or host device 105.

The issue (along with any solution that has been applied) can be tagged 605 in ADAS 107 for future analysis and/or reporting. The system can then check 606 for similar issues occurring in cell systems 100 from similar lots, of similar age, use level, geographic location, and/or the like, to determine whether there is correlation based on any of these factors. Any applied adjustment or response can then be tuned 607 based on any additional information available from ADAS 107. In at least one embodiment, the system automatically notifies 608 user 109 of the issue, including the particular location(s) on track 104 where the issue took place.

If, in step 601, it is determined that the performance drop is not correlated with a location on track 104, a determination is made 609 as to whether the performance drop has a cyclic or regular frequency. If so, the system checks 610 for correlation between the performance drop frequency and the period of wheel rotation. If such a correlation exists 611 with one or more wheels of vehicle 103, it can be inferred that the problem is with a wheel, tire, or related part. User 109 can be automatically notified 612 of the issue, for example by alerting user 109 to inspect the tires and wheels. The issue is tagged 613 in ADAS 107. In at least one embodiment, the system can then check 606 for similar issues occurring in cell systems 100 from similar lots, of similar age, use level, geographic location, and/or the like, to determine whether there is correlation based on any of these factors. An inline response is applied 615 using any relevant information from ADAS 107.

If, in step 609, it is determined that the performance drop does not have a cyclic or regular frequency, the system proceeds to step 616, where it collects sample images taken by the camera of vehicle 103, at known locations on track 104 if possible. Such images can then be analyzed 617 (either automatically or by a human) for obfuscation, lens aberration, focal variation, and/or any other problems or issues. In at least one embodiment, the system can then check 606 for similar issues occurring in cell systems 100 from similar lots, of similar age, use level, geographic location, and/or the like, to determine whether there is correlation based on any of these factors. If an inline solution is known (based, for example, on data and analysis from ADAS 107) 619, an inline response is applied 615 using any relevant information from ADAS 107. In at least one embodiment, the system automatically notifies 621 user 109 of the issue and informs user 109 of available actions that can be taken. The method then ends 699.

In at least one embodiment, the system may consider information collected from other vehicles 103 navigating a particular track 104 to determine whether a performance issue is on-board a particular vehicle 103 or is a part of a shared component of the system external to vehicle 103 in question, such as a problem with track 104. In at least one embodiment, vehicles 103 operating autonomously (i.e., not controlled by a human player) may be configured to automatically alter their courses to some degree so as to drive over portions of track 104 where another vehicle 103 was passing when it experienced a performance issue. This may be done in a way that is imperceptible to users 109 or otherwise has no material impact on gameplay or other use of the system. In this manner ADAS 107 can collect useful data to analyze the performance issues in parallel with normal system operation in a manner that is invisible or near-invisible to users 109. Alternatively or additionally, the system can direct vehicles 103 to pass over the relevant portion of track 104 at an opportune pause in use, or it may suspend use to permit vehicles 103 to execute their examination passes over the area in question.

Recognizing that a cell system 100 may have a multiplicity of peers in similar operation using the same equipment, in at least one embodiment the system can vet problems on one cell system 100 by polling performance of others in the population. As described in step 606, ADAS 107 may select peer cell systems 100 that have relevant components that are identical or that were manufactured in the same lot, and check their performance for variation or lags that might be similar to the detected problem. A survey of the population of cell systems 100 under monitoring and administration might reveal that some portions are adequately similar to use for vetting a performance issue detected in a particular cell system 100. Referring again to FIG. 1, the candidate sub-population, for example, might include some subset of cell systems (indicated as cell systems 100A) shown as empty squares. Among these, if a number of them reveal a similar performance issue (indicated as cell systems 100B), ADAS 107 can look for consistencies among these cell systems 100B with respect to manufacturing, distribution, and/or sales, and a report can be generated identifying the issue and any statistically significant similarities across the cell systems 100B demonstrating the performance problem. Cell systems 100C are those that do not form part of the candidate sub-population, either because they differ in nature or configuration from cell system 100X being analyzed, or for some other reason.

In at least one embodiment, ADAS 107 can be used to detect issues with track 104 and can help resolve such issues. In the current example of vehicles 103 traveling on track 104, collected data can relate to functional operation of the component parts (e.g., vehicles 103, track 104, and/or devices 105, 106) that constitute cell system 100. In addition, data related to users 109 and user interaction can be collected and used by ADAS 107 for monitoring and administration of cell system 100 or a population of cell systems 100.

For example, ADAS 107 may perform cohort analysis based on available or discernable attributes such as how much time has elapsed since a user's 109 first engagement, user skill level, frequency of play, and/or or the number of distinct users 109 who have engaged with a particular user 109, among others. The correlations that ADAS 107 analyses yield in this area, when coupled with the visibility that the system may provide on all active components and users 109, can provide useful actionable information.

In at least one embodiment, the result of data collection and the various analyses performed on the available data is a set of relationships that characterizes cell system 100. These relationships serve as a reference for identifying variances in the operation or performance of any component of cell system 100 and also provide the basis for predicting performance. It is understood that correlations determined among data reflect a population of cell systems 100 in use and potentially undergoing change. In this fashion, relationships established among existing data can be used as a benchmark for new data.

In various embodiments, ADAS 107 described herein has the capacity to characterize the operation of a cell system 100 by drawing data from cell system 100 itself as well as external or contextual data, so as to detect potential correlations. The extent of inclusion of data external to a particular cell system 100 under scrutiny can be defined in advance. In at least one embodiment, in characterizing performance of cell systems 100 with physical components, the system takes into account external data streams that are contextual in the physical environment (such as geographic location, time/date, sunrise/sunset, weather, temperature, humidity, and/or the like). In an example in which a performance issue might be isolated to a portion of track 104, an external factor that might influence vehicle's 103 ability to use optical means to read encoded data could be ambient light. In the case where data decoding problems are detected, but isolated to a portion of track 104, geographic location and time of day can be introduced as correlating data. Time of day could be important index data to attach if performance issues are transient; thus, over successive uses, ADAS 107 can determine if recurrence is related to the time of day during which the racing vehicle system is in use. The external data streams of geographic location, weather, time and date can also be useful in assessing whether, for instance, a transient external light source (i.e., sunlight) of sufficient intensity to impair decoding data may be shining on track 104. In the example cell system 100 described, environmental factors other than natural lighting may also be a factor in performance, such as static electricity and the like; such conditions may become a significant factor depending on prevailing atmospheric conditions. These examples are provided here for illustrative purposes only.

ADAS Structure and Function

In at least one embodiment, ADAS 107 is implemented as a data-driven construct that gathers, organizes, and aggregates data. In at least one embodiment, the described system uses input data feeds to build models and find correlations between and among the received information. The broader the types of data that are provided and the wider the span of a unit's production life that relevant data covers, the more robustly ADAS 107 is able to characterize a system (such as cell system 100) under study.

Figure 7:
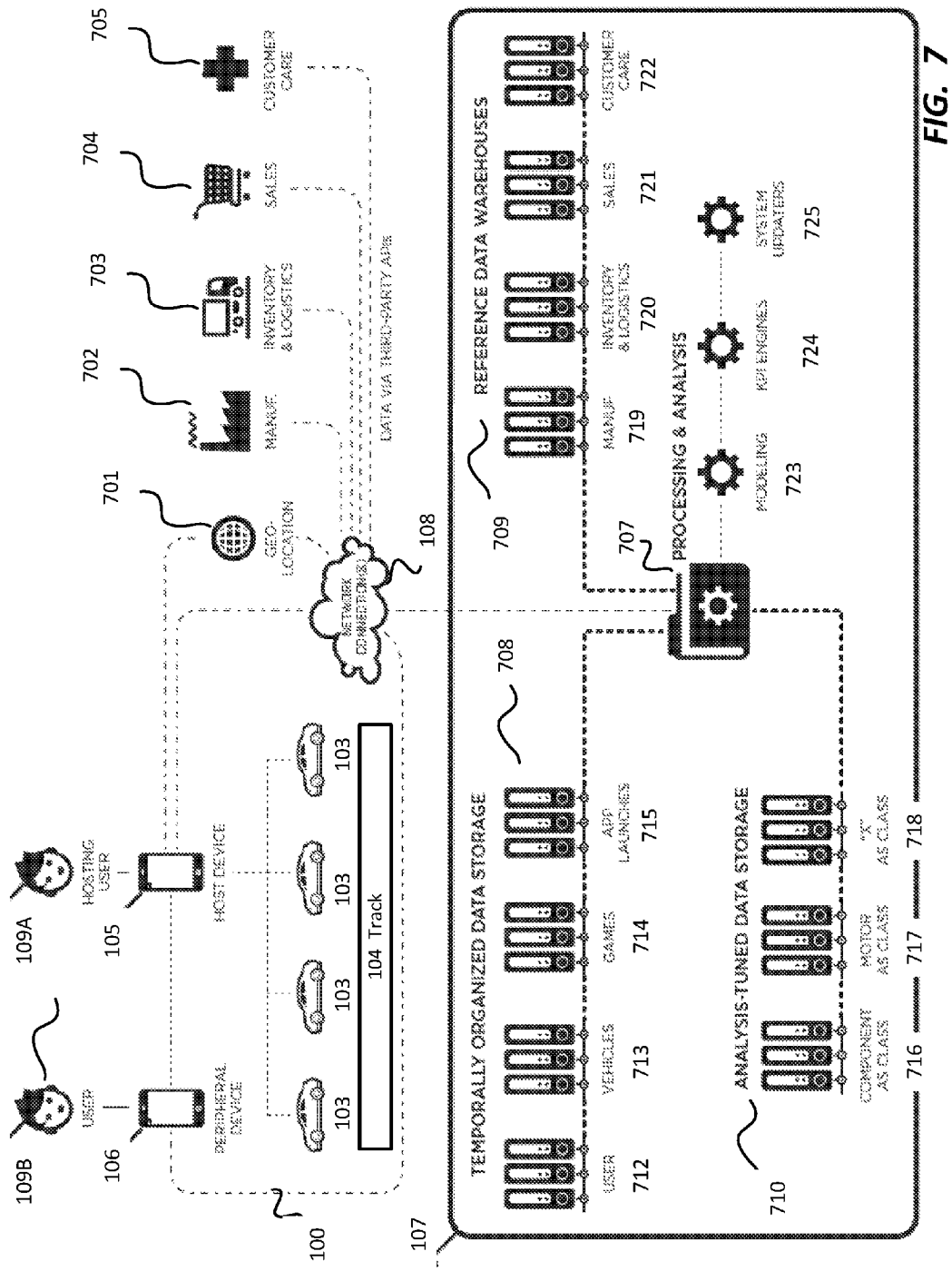
FIG. 7 is a block diagram depicting an example of an architecture for implementing an ADAS according to one embodiment.

Referring now to FIG. 7, there is shown a block diagram depicting an example of an architecture for implementing ADAS 107 according to one embodiment. One skilled in the art will recognize that the architecture shown in the example is merely provided for illustrative purposes, and that many other architectures can be used for implementing ADAS 107 in various contexts.

FIG. 7 illustrates an embodiment of the system as it might apply to the population of cell systems 100 depicted in FIG. 1. One skilled in the art will recognize that the depicted embodiment is merely exemplary, and that the system described herein can be implemented in many other contexts. As in FIG. 1, primary components of a cell system 100 include vehicles 103 that connect to host device 105 which may be controlled by user 109A. Peer user 109B is also using cell system 100 via peripheral device 106, which controls one of vehicles 103 via connection through host device 105. Both devices 105, 106 connect to ADAS 107 via some type of network connection 108, which may be the Internet, a cellular connection, or any other type of electronic connection. Data collected during operation of cell system 100 is directed into ADAS 107. Cell system 100 can be one of any number of cell systems 100 from which ADAS 107 collects information.

In at least one embodiment, data from cell system 100 operation and use are one part of the information flow pertinent to the function of the system. In at least one embodiment, ADAS 107 can also draw complementary data from other sources, for example via third-party APIs or other means.

For example, in at least one embodiment, ADAS 107 collects information during the manufacturing process 702 of cell system 100. Such information can be collected as parts used in the assembly of cell system 100 find their way onto a production line; such information can be organized based on the production of an individual finished unit. Such parts can include, for example, electronic components provided by a vendor to a contract manufacturer, plastic parts injection molded at the contract manufacturer's own facility, or the like. In at least one embodiment, one aspect of the collected information may be the bill of materials, including data such as lot numbers and dates of manufacture.

In at least one embodiment, ADAS 107 collects data describing results of quality control tests performed during the manufacturing process 702, thus creating a baseline performance record of each component of cell system 100. Collection of such production data can be helpful in facilitating system diagnostics executed in the post-sales stage, as described below. Even data gathered on an incomplete unit or a sub-assembly of cell system 100 can provide information relevant to diagnosing problems or issues that may occur on a finished unit in the field, since such data can provide corroboration of an issue identified on other units, or even a starting point for analysis. Such collected information can be the result of a broad set of tests, conducted on the manufacturing line or elsewhere, each addressing specific aspects of performance, and/or one or more final stage tests that puts a finished product or component through a set of use cases in which the conditions of use and product operating ranges are comprehensively assessed.

Beyond the factory environment, additional data can be gathered on cell system 100 and its components on a per-unit basis, for example using tracking efforts applied during inventory and logistics processes 703. In at least one embodiment, units are tracked by pallet and/or by shipment, so as to retain the ability to know where specific units are in the supply chain at points beyond the production floor (for example, in transit on a freight vessel, at a warehouse in the region of distribution, or delivered to a specific retailer). It is understood that collecting information at these intermediate stages between production and use may be limited by a number of factors, but their absence need not prevent the system from executing its primary functions. The value of knowing a product's path between manufacturing and its end user can be appreciated from the perspective of understanding how well a logistics flow serves the sales and distribution process and the potential to make improvements. In addition, attaching data to an individual product which characterizes storage (e.g., duration, location—which can establish the conditions of storage such as temperature and humidity) can prove useful in identifying a population of products with shared portions of their history and thereby spot potential relationships between that history and aspects of product performance in the field.

Additional information can be collected form sales department 704 and/or customer care department 705, at the point of transaction and/or thereafter. It will be recognized that sales information may vary depending on potential variability of the channels through which products may be sold and the degree to which they support data sharing with a supplier. Potential data that may be reported to the system might include, for example, date of sale, location, and the like. Where available, sales information 704 can include data that can tie purchases to particular users 109 or devices 106, thereby affording greater visibility on the use and performance of an individual unit (such as a particular vehicle 103). Customer service information 705 can include interactions with service agents.

Data sources 702 through 705 may, in some respects, be considered external to the population of cell systems 100 being monitored. For instance, while manufacturing-related information 702 may be useful in identifying performance variations owing to variations in production design, it is contextual information to an extent, since product manufacturing occurs prior to a product's actual use in the field.

In various embodiments, data from sources 702 through 705 can be organized in any of a number of different ways in connection with the described system. The embodiment described in FIG. 7 outlines several major areas of data organization supporting core functionality. These can be provided singly or in any suitable combination with one another Temporally organized data storage 708 includes information that has a relevant time metric, such as motions executed by each vehicle 703, and/or the use of a controlling application for a game (e.g., launches of an app related to the operation of the cell system), and/or a user's 109 engagement with a cell system 100. These can also include any relevant time-based metrics on a component level, such as for example, the current draw on motors 303 or the rate of image capture in a camera. FIG. 7 depicts several examples of such temporally organized data storage, including user data 712, vehicle data 713, games data 714, and app launches data 715.

In at least one embodiment, data that may not be easily organized accordingly to a time-based ordinate may be separately stored in reference data warehouses 709 that form part of (or are accessible to) ADAS 107. Such warehouses 709 may include specific data storage components 719 through 722 for manufacturing data, inventory and logistics, sales, and customer care, respectively. Such data in warehouses 709 can be tagged, for example, with identifiers that can connect it to data stored elsewhere (such as data stored for a particular user 109, vehicle 103, and/or device 106). In at least one embodiment, other information such as geolocation 701) can also be stored in data warehouses 709; such data can be captured from a host device 105, peripheral device 106 or the like via a third-party API during the use of cell system 100.

In at least one embodiment, ADAS 107 includes a processing and analysis module 707 that draws upon data from temporally organized data storage 708 and/or reference data warehouses 709 to develop models and to identify correlations that characterize cell system(s) 100(s). ADAS 107 subsequently applies such data and models to perform tasks, issue notifications, automatically order replacements, and/or the like.

In at least one embodiment, module 707 of ADAS 107 includes several subcomponents, such as modeling module 723, key performance indicator (KPI) engine(s) 724, and/or system updater(s) 725. System updaters 725 automatically apply changes or make adjustments to cell systems 100 according to the models developed through data analysis. In at least one embodiment, ongoing measurement closes the loop by providing feedback on how adjustments may have affected system performance.

To illustrate how the described system might operate to apply models of component or subcomponent function intended to optimize system performance and gather feedback on any resulting adjustments, it is useful to consider the previous example outlined in FIG. 1. As described above, in FIG. 1, ADAS 107 is implemented in connection with one or more cell system(s) 100, each including a set of vehicles 103 configured travel on a track 104 as part of a racing game.

Figure 10:
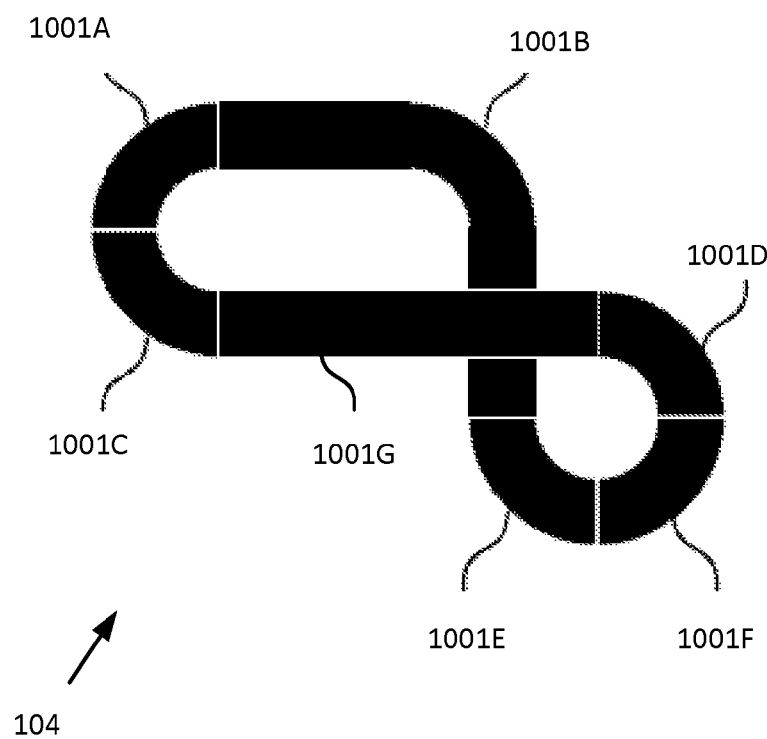
FIG. 10 depicts an example of a track constructed from a number of modular pieces, according to one embodiment.

Referring now also to FIG. 10, there is shown an example of such a track 104 constructed from a number of modular pieces 1001A-1001G, or road segments. The various modular pieces 1001 can have different standard shapes; they can be connected to one another in various configurations so as to provide versatility in driving circuit layout.

The various techniques described herein can be applied to such a modular track 104 as depicted in FIG. 10. In particular, the method depicted in FIG. 6 can be applied to analysis and treatment of individual modular pieces 1001 as well as to the track 104 as a whole. For example, suppose a manufacturing variance or defect is present in certain lots of certain segment types (such as those segments 1001A, 1001B, 1001C, 1001D, 1001E, 1001F that have a 90° turn), but not in other segment types (such as straight segment 1001G). Such a variance or defect might be, for example, an excess application of an surface enamel that might create obfuscating glare under normal LED illumination during scanning or, conversely, an excess application of ink that inhibits scanning under normal LED illumination. In such a circumstance, the method of FIG. 6 could yield detection of the problem in cell systems 100 whose tracks 104 contain flawed track pieces 1001. Steps 601, 603, 604, 605, 606, 607, 608 that serve to identify the potential nature of a problem on a single-piece track 104 could functional as well on tracks 104 made of individual pieces 1001 as depicted in FIG. 10.

In such an example, the system could perform a process of analysis that determines a degree of increase or decrease of the intensity of illuminating LED 321 to improve or facilitate scanning. For example, increased intensity might be appropriate in the instance that an excess of ink was applied during manufacturing, while decreased intensity might be appropriate in the instance that too rich an enamel layer was applied to a track piece 1001. Using the techniques described herein, ADAS 107 can quickly determine the extent of the defective track pieces 1001 present across all cell systems 100.

While the method described in FIG. 6 provides an example of a qualitative solution (e.g., increasing LED intensity), in at least one embodiment, ADAS 107 can perform additional operations such as setting a new light level for LEDs 321 when vehicles 103 are traveling over track pieces 1001 determined to be flawed. ADAS 1007 can make such determination through a number of different means, for example by detecting problems in scanning and corroboration of the likely presence of the defect through shared manufacturing date or lot codes In addition, since in at least one embodiment, ADAS 107 can make use of feedback from a cell system 100 or systems, a population of cell systems 100 containing defective track pieces 1001 presents an opportunity to rapidly converge on an ideal setting. ADAS 107 may determine a range of candidate light intensities and assign them to particular defective track pieces 1001, such that vehicles 103 would adjust their onboard illuminating LED 321 to the new level when passing over a specific track piece 1001. For the example modular track 104 as depicted in FIG. 10, six different light intensity values could be applied in a single circuit of a single cell system 100. In this fashion, ADAS 107 could quickly determine what the optimum light intensity adjustment might be based on a process of assigning candidate values and assessing the consequent scanning performance (i.e., feedback from the system) and adjusting as necessary. Such adjustments may include, for example, refining the candidate light intensity level(s) and/or assigning an appropriate level determined through the process of analysis. In more sophisticated approaches, the optimal LED intensity can be determined in concert with other factors that further tailor it. Such factors can be introduced based on the type of vehicle 103 performing the scan, or what the ambient light level might be in the environment in which a cell system is operating, or the like.

Accordingly, as illustrated in this example, ADAS 107 can aptly use feedback from a cell system 100 to determine how well or how poorly changes made in operating parameters or key indicators have improved system performance once sub-optimal operation or substandard components are determined to be present in one or more cell systems 100.

In at least one embodiment, ADAS 107 also includes analysis-tuned data storage 710 for storing models and correlations, such as those generated by processing and analysis module 707. The data stored in 710 can be organized by component as class 716, motor as class 717, or any other data element "x" as class 718.

Social Relationships and Marketing Adaptation

In at least one embodiment, ADAS 107 can monitor and record operational data for a plurality of cell systems 100. The quantity of data collected may be extensive and can include information from any number of cell systems 100. In at least one embodiment, ADAS 107 can use such data to perform many functions beyond optimizing performance of a particular cell system 100.

In at least one embodiment, ADAS 107 can be configured to map connections between users 109 of various cell systems 100, for example via social networks.

Figure 8:
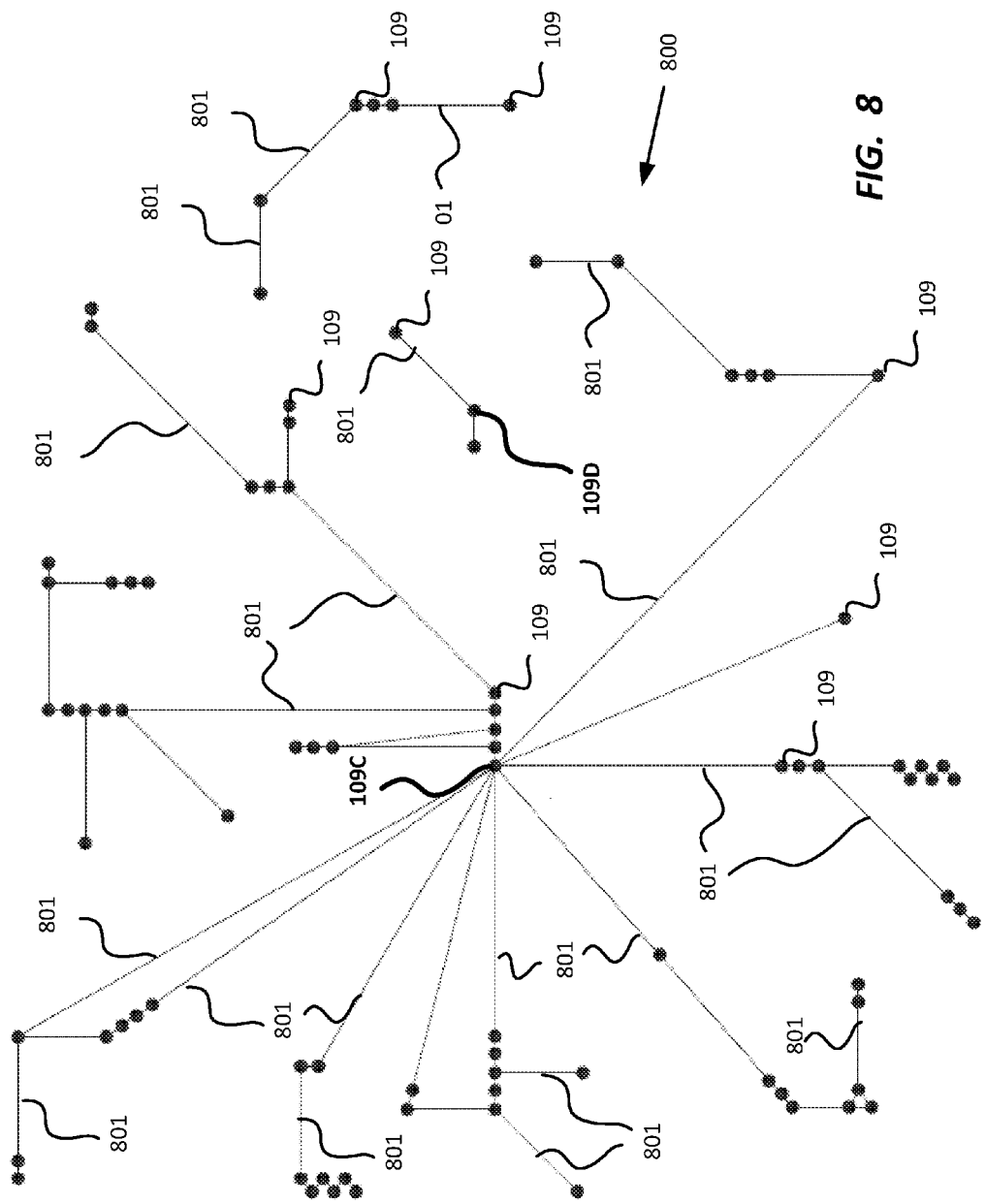
FIG. 8 is an example of a graph depicting relationships among users who have used one or more cell system(s), according to one embodiment.

Referring now to FIG. 8, there is shown an example of a graph 800 depicting relationships 801 among users 109 who have used one or more cell system(s) 100, according to one embodiment. Any of a number of approaches may be employed to uniquely identify users 109 within a population that might move fluidly among cell systems 100. For example, in at least one embodiment, an account system is implemented that permits ADAS 107 to recognize users 109 even when they use different hardware elements such as devices 106.

In graph 800, users 109 are shown as dots; lines 801 connecting dots represent relationships between users 109 based on mutual use of a cell system 100. In the example of the racing game described in the above-cited related applications, players who have competed in the same game would be joined by a line 801. Such a graph can therefore be valuable from a marketing perspective, as the most socially active users 109 are readily identifiable.

In the example of graph 800, user 109C has connections to a large number of other users 109 in the population, while user 109D has very few connections to other users 109. As a marketer contemplates how to most effectively deploy resources to a community of users 109, the ability to target the most connected, influential, or visible users 109 is immensely valuable. The most connected users 109 across a social group are the most likely to be the most influential evangelists in favor of the product; accordingly, there is value in co-opting these users 109 toward building awareness for new products or services.

In the example graph 800 of FIG. 8, a company might enlist an active user 109 such as user 109C to assist in the introduction of a new feature or system component, for example by providing the new feature or system to user 109C for free or at a discount. The company determines that by providing the new feature or system to user 109C in this manner, the new feature or system is more likely to gain broad exposure than if a similar offer were provided to user 109D. Seeding a community through its top users 109 (such as user 109C) is likely a much more effective approach than a random distribution.

In addition, a social map of users 109 such as graph 800 provides a starting point for deeper analysis. Demographic similarities may be of interest, and usage patterns can also be a focus of study. In the latter case, ADAS 107 can identify groups that may be connected but that are stagnant in their commercial engagement, thereby providing an opportunity for targeted outreach with respect to special offers. Such an outreach might, for example, provide one user 109 with a competitive edge (in the gameplay context) over other users 109 in his or her group. This can be used to disrupt an established play pattern and hence incentivize other users 109 in the group to pursue similar performance improvements, which may be in the form of pursuing additional product accessories or play components. In this fashion, ADAS 107 can focus on play clusters and identify specific opportunities to market products or enhancements in a manner that is more effective than would a broad campaign.

Furthermore, in at least one embodiment, ADAS 107 can perform deeper analysis of product use by tracking product use across users 109 and groups. In at least one embodiment, ADAS 107 can use graph 800 to determine metrics of speed of social adoption of new product and product features by word of mouth or social play. In at least one embodiment, ADAS 107 can deliver targeted messaging during product use to impact and more closely measure the word or mouth or social spread, for example by including referral benefits or displaying social sharing capabilities adaptively in the user interface. Through personalized adaptation, ADAS 107 system can tune each user's 109 social participation to maximize product evangelism as well as the enjoyment of each individual user 109.

Additionally, in at least one embodiment, data collected by ADAS 107 across a population of cell systems 100 is used to determine metrics that can be difficult to measure directly. For example, consider the instance in which ADAS 107 is used to monitor a population of cell systems 100 including competitive racing games such as described in the above-cited related applications. Since such a cell system 100 is a product intended for entertainment, it involves enjoyment, which is by itself a subjective experience that is difficult to measure or quantify. Also, since the product is a competitive game, it can be played in a variety of styles and, as much as it replicates a vehicle racing experience, it enables users 109 to drive in the manner of their choosing. For the developer of the product, an end goal is to maximize the enjoyment of users 109.

The challenge in maximizing the enjoyment of users 109 is to understand what aspects of play are the most enjoyable to any particular user 109. Because ADAS 107 can monitor several information streams generated during play and can seek to identify correlations among them, it is disposed to recognize what manner of play is likely to provide the most enjoyable experience for a particular user 109.

For example, a user 109 may frequently employ a strategy of attacking opponents by accelerating toward them from behind and delaying a foray until his or her vehicle 103 is very close behind the target vehicle 103. There are many aspect of play that could make this challenging, but fundamentally, such a strategy likely requires rapid acceleration, particularly on a track 104 that might have many tight turns and thereby restrict driving at top speed for any sustained duration.

In such a context, ADAS 107 can monitor a user's 109 performance with respect to metrics that keep track of time spent trailing an opponent's vehicle 103 and average distance between vehicles 103 at the time of attack, as well as how the distance between vehicles 103 trends (e.g., whether the attacking vehicle 103 exhibits a gradual but persistent rate of approach toward the average attack distance). Based on such an assessment, ADAS 107 can determine that user's 109 preferred approach to play could be augmented by adjusting the vehicle's 103 factory configuration to enable higher rates of acceleration. It can be appreciated that acceleration could be limited for a variety of practical reasons such as dynamic stability, motor lifetime, or battery charge, and that a change in acceleration limit could alter game balance. In consideration of these, ADAS 107 might also adjust vehicle's 103 top speed downward in balance with increasing its peak acceleration. In a manner consistent with embodiments described elsewhere, after ADAS 107 makes such an adjustment, it can monitor user's 109 play pattern to determine if usage increased or if play duration changed in a way that would indicate a greater interest in using the product. Additionally, ADAS 107 can also monitor vehicle's 103 electro-mechanical system to determine if the alteration in vehicle's 103 operating parameters has a long-term effect on the durability of one or more components.

As ADAS 107 performs similar analyses across cell systems 100 and populations of users 109, users 109 can be clustered into groups based on factors such as play style. The greater the confidence ascribed to the relationships that establish one style versus another, the more broadly and potentially more quickly a user 109 can be identified by type. In at least one embodiment, aspects of a user's 109 cell system 100 can be modified to suit likely preferences of that user 109. In this manner, ADAS 107 can help to tailor aspects or components of a cell system 100 to fit the anticipated preferences of a user 109. In at least one embodiment, the system can provide user 109 with direction on selecting particular accessories or components that would most suit that user's 109 preferences. Likewise, once ADAS 107 has established a style type or other characteristic that best describes a user 109, ADAS 107 can configure new components or hardware introduced to a cell system 100 to better fit a user's 109 preferences even before the first use of that cell system 100.

In this fashion, ADAS 107 can implement an adaptable monitoring and administrative system that can construct models of performance and their parameters based on a population of similar cell systems 100 in use. In at least one embodiment, ADAS 107 is implemented according to a closed-loop design that affords it broad applicability and usefulness, as it can test its models and refine them based on how adjustments based on those models were observed to affect cell systems 100 under study. The applicability of such a system across a number of cell systems 100 offers value that increases with the size of the population of cell systems 100.

Accordingly, various embodiments of the described system fundamentally improve aspects of individual cell system 100 performance, user satisfaction with both cell system 100 function and manufacturer service of said cell system 100, lifetime of cell systems 100 and their components, performance optimizations across multiple cell systems 100, and non-operational considerations such as marketing efficacy.

The above description and referenced drawings set forth particular details with respect to possible embodiments. Those of skill in the art will appreciate that other embodiments are possible. First, the particular naming of the components, capitalization of terms, the attributes, data structures, or any other programming or structural aspect is not mandatory or significant, and the mechanisms described herein may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

Some embodiments relate to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method set forth herein are not described with reference to any particular programming language. It will be appreciated that a variety of programming languages may be used to implement the teachings described herein, and any references above to specific languages are provided for illustrative purposes only.

Accordingly, various embodiments may include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used include: a mobile phone, personal digital assistant, smartphone, kiosk, server computer, enterprise computing device, desktop computer, laptop computer, tablet computer, consumer electronic device, or the like. An electronic device for implementing the system or method described herein may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, this disclosure is intended to be illustrative, but not limiting.

What is claimed is:

1. A system comprising:
   an adaptive analytics system comprising one or more computers and one or more storage devices storing instructions that are operable, when executed by the one or more computers, to cause the one or more computers to perform operations to remotely control actions of one or more robots, the operations comprising:
      obtaining, by the adaptive analytics system from the one or more robots, a plurality of respective values for an operational attribute recorded by the one or more robots, the values respectively representing a property of respective environments of the one or more robots;
      aggregating by the adaptive analytics system, the plurality of values to compute a benchmark range of values for the operational attribute;
      receiving, by the adaptive analytics system from a first robot of the one or more robots, a first value of the operational attribute recorded by the first robot at a first location in a first environment of the first robot;
      determining, by the adaptive analytics system, that the first value of the operational attribute recorded by the first robot is outside the benchmark range of values for the operational attribute; and
      in response to determining that the first value of the operational attribute recorded by the first robot is outside the benchmark range of values for the operational attribute,
         selecting a particular robot from the one or more robots to navigate toward the first location in the first environment of the first robot and to record a subsequent value for the operational attribute,
         generating one or more commands that when executed by the particular robot cause the particular robot to navigate toward the first location in the first environment and to record the subsequent value of the operational attribute, and
         providing, by the adaptive analytics system to the particular robot, the one or more generated commands; and
   one or more robots, each robot comprising one or more actuators that are each configured to effect a physical movement of the robot, one or more processors, and one or more storage devices storing instructions that are operable, when executed by the one or more processors, to cause the robot to perform operations comprising:
      receiving, by the robot from the adaptive analytics system, the one or more generated commands; and
      executing the one or more generated commands to perform operations comprising:
         navigating toward the first location in the first environment of the first robot at which the first value of the operational attribute was recorded,
         recording a subsequent value of the operational attribute, and
         providing, by the robot to the adaptive data analytics system, the recorded subsequent value of the operational attribute.

2. The system of claim 1, wherein the operations further comprise scheduling, by the adaptive analytics system, a time for the particular robot to navigate toward the first location in the first environment of the first robot and to record the subsequent value for the operational attribute.

3. The system of claim 2, wherein scheduling a time for the particular robot to navigate toward the first location comprises scheduling the navigation and recording to be performed during a current task being performed by the particular robot.

4. The system of claim 2, wherein scheduling a time for the particular robot to navigate toward the first location comprises scheduling the navigation and recording to be performed after a current task being performed by the particular robot.

5. The system of claim 1, wherein the operations further comprise determining, by the adaptive analytics system, that the recorded subsequent value of the operational attribute is outside the benchmark range of values for the operational attribute.

6. The system of claim 5, wherein the operations further comprise providing, by the adaptive analytics system, a notification to a user that the first and subsequent values of the operations attribute recorded in a first location in the first environment are outside the benchmark range of values for the operational attribute.

7. The system of claim 1, wherein the robots comprise toy vehicles.

8. The system of claim 7, wherein the respective environments comprise respective encoded racing tracks for toy vehicles.

9. The adaptive analytics system of claim 8, wherein the plurality of respective values for the operational attribute represent values generated by the toy vehicles while decoding the encoded racing tracks.

10. A computer program product, encoded on one or more non-transitory computer storage media, comprising instructions that when executed by one or more computers cause the one or more computers to perform operations to remotely control actions of a one or more robots, the operations comprising:
  obtaining, by an adaptive analytics system from the one or more robots having one or more similar operating characteristics, a plurality of respective values for an operational attribute recorded by the one or more robots, the values respectively representing a property of respective environments of the one or more robots;
  aggregating by the adaptive analytics system, the plurality of values to compute a benchmark range of values for the operational attribute;
  receiving, by the adaptive analytics system from a first robot of the one or more robots, a first value of the operational attribute recorded by the first robot at a first location in a first environment of the first robot;
  determining, by the adaptive analytics system, that the first value of the operational attribute recorded by the first robot is outside the benchmark range of values for the operational attribute; and
  in response to determining that the first value of the operational attribute recorded by the first robot is outside the benchmark range of values for the operational attribute,
    selecting, by the adaptive analytics system, a particular robot from the one or more robots to navigate toward the first location in the first environment of the first robot and to record a subsequent value for the operational attribute,
    generating, by the adaptive analytics system, one or more commands that when executed by the particular robot cause the particular robot to perform operations comprising:
      navigating toward the first location in the first environment of the first robot at which the first value of the operational attribute was recorded,
      recording a subsequent value of the operational attribute, and
      providing, to the adaptive data analytics system, the recorded subsequent value of the operational attribute, and
    providing, by the adaptive analytics system to the particular robot, the one or more generated commands.

11. The computer program product of claim 10, wherein the operations further comprise scheduling, by the adaptive analytics system, a time for the particular robot to navigate toward the first location in the first environment of the first robot and to record the subsequent value for the operational attribute.

12. The computer program product of claim 11, wherein scheduling a time for the particular robot to navigate toward the first location comprises scheduling the navigation and recording to be performed during a current task being performed by the particular robot.

13. The computer program product of claim 10, wherein scheduling a time for the particular robot to navigate toward the first location comprises scheduling the navigation and recording to be performed after a current task being performed by the particular robot.

14. The computer program product of claim 10, wherein the operations further comprise determining, by the adaptive analytics system, that the recorded subsequent value of the operational attribute is outside the benchmark range of values for the operational attribute.

15. The computer program product of claim 14, wherein the operations further comprise providing, by the adaptive analytics system, a notification to a user that the first and subsequent values of the operations attribute recorded in a first location in the first environment are outside the benchmark range of values for the operational attribute.

16. The computer program product of claim 10, wherein the robots comprise toy vehicles.

17. The computer program product of claim 16, wherein the respective environments comprise respective encoded racing tracks for toy vehicles.

18. The computer program product of claim 17, wherein the plurality of respective values for the operational attribute represent values generated by the toy vehicles while decoding the encoded racing tracks.

19. A system comprising:
  an adaptive analytics system comprising one or more computers and one or more storage devices storing instructions that are operable, when executed by the one or more computers, to cause the one or more computers to perform operations to remotely control actions of one or more robots, the operations comprising:
    obtaining, by the adaptive analytics system from the one or more robots having one or more similar operating characteristics, a plurality of respective values for an operational attribute representing a property of respective environments of the one or more robots;

aggregating by the adaptive analytics system, the plurality values to compute a benchmark range of values for the operational attribute;

receiving, by the adaptive analytics system from a first robot of the one or more robots, a first value of the operational attribute recorded by the first robot at a first location in a first environment of the first robot;

determining, by the adaptive analytics system, that the first value of the operational attribute recorded by the first robot is outside the benchmark range of values for the operational attribute;

in response to determining that the first value of the operational attribute recorded by the first robot is outside the benchmark range of values for the operational attribute, determining an increased performance rate of a physical component of the first robot, wherein the physical component was used to record the first value of the operational attribute at the first location in the first environment;

generating one or more commands that when executed by the first robot cause the first robot to record the subsequent value of the operational attribute at the increased performance rate, and providing, by the adaptive analytics system to the first robot, the one or more commands to cause the first robot to record the subsequent value of the operational attribute at the increased performance rate; and one or more robots of the one or more robots, each robot comprising one or more actuators that are each configured to effect a physical movement of the robot, one or more processors, and one or more storage devices storing instructions that are operable, when executed by the one or more processors, to cause the robot to perform operations comprising:

receiving, by the first robot from the adaptive analytics system, the one or more generated commands; and executing the one or more generated commands to perform operations comprising:

recording a subsequent value of the operational attribute at the increased performance rate, and providing, by the first robot to the adaptive data analytics system, the recorded subsequent value of the operational attribute recorded at the increased performance rate.

20. The system of claim 19, wherein the operations further comprise navigating toward the first location during a current task being performed by the first robot.

21. The system of claim 20, wherein navigating toward the first location comprises navigating after a current task being performed by the first robot.

22. The system of claim 19, wherein the robots comprise toy vehicles.

23. The system of claim 22, wherein the respective environments comprise respective encoded racing tracks for toy vehicles.

24. The system of claim 23, wherein the plurality of respective values for the operational attribute represent values generated by the toy vehicles while decoding the encoded racing tracks.

25. The system of claim 24, wherein the physical component performs decoding of the encoded racing tracks.

26. The system of claim 25, wherein the physical component comprises a camera imager chip or an LED.

* * * * *